(12) United States Patent
Ito

(10) Patent No.: US 7,688,519 B2
(45) Date of Patent: Mar. 30, 2010

(54) ZOOM LENS AND IMAGE PICKUP APPARATUS INCLUDING THE SAME

(75) Inventor: Daisuke Ito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 415 days.

(21) Appl. No.: 11/860,286

(22) Filed: Sep. 24, 2007

(65) Prior Publication Data

US 2008/0080062 A1    Apr. 3, 2008

(30) Foreign Application Priority Data

Sep. 29, 2006    (JP) ............................ 2006-267614

(51) Int. Cl.
*G02B 15/14*    (2006.01)
*G02B 15/20*    (2006.01)

(52) U.S. Cl. .................. 359/683; 359/687; 359/676

(58) Field of Classification Search ............... 359/676, 359/683, 686–687, 726–737, 678; 396/72–88; 348/240.99–240.3; *G02B 15/14, 15/20*
See application file for complete search history.

(56) References Cited

U.S. PATENT DOCUMENTS

| 5,963,378 A | 10/1999 | Tochigi et al. | |
|---|---|---|---|
| 6,166,864 A | 12/2000 | Horiuchi | |
| 7,206,139 B2 * | 4/2007 | Bito et al. | 359/690 |
| 7,307,797 B2 * | 12/2007 | Yoshitsugu et al. | 359/689 |
| 7,369,326 B2 * | 5/2008 | Yagyu et al. | 359/689 |

2004/0233302 A1    11/2004    Kojima

FOREIGN PATENT DOCUMENTS

| JP | 7-270684 | 10/1995 |
|---|---|---|
| JP | 11-305124 | 11/1999 |
| JP | 2000-180724 | 6/2000 |
| JP | 2004-102089 | 4/2004 |
| JP | 2004-347712 | 12/2004 |

* cited by examiner

*Primary Examiner*—Darryl J Collins
*Assistant Examiner*—Zachary Wilkes
(74) *Attorney, Agent, or Firm*—Canon USA Inc IP Div

(57) ABSTRACT

A zoom lens includes, from object to image side, a first unit having positive refractive power, a second unit having negative refractive power, including a negative lens member and prism from the object to image side, and being stationary during zooming, a third unit including an aperture, and fourth and fifth units having positive refractive powers. The zoom lens satisfies the following conditions:

$$0.20 < |f2|/\sqrt{(fW \cdot fT)} < 0.45$$

$$0.80 < |fN/fW| < 1.90$$

$$2.70 < L/fW < 4.20$$

where fw and fT represent focal lengths of an entire system at a wide-angle and telephoto end, f2 represents a focal length of the second unit, fN represents a focal length of the negative lens member, a light-axis direction length of the prism is an air conversion length, and L represents a distance on the light axis from a second-unit lens surface closest to the object side to the aperture at the wide-angle end.

12 Claims, 26 Drawing Sheets

ZOOM LENS AND IMAGE PICKUP APPARATUS INCLUDING THE SAME

BACKGROUND OF THE INVENTION

1. Field of the Invention

The present invention relates to a zoom lens, which is suitable for an imaging lens for an image pickup apparatus, such as a video camera, a digital still camera, a broadcasting camera, or a silver-halide photography camera.

2. Description of the Related Art

It is important that an imaging lens, used in an image pickup apparatus using a solid-state image pickup element, be a compact, high-performance, high-powered zoom lens. A rear-focusing type zoom lens that performs focusing as a result of moving units other than an object-side first unit is one type of zoom lens that satisfies this requirement.

As the rear-focusing type zoom lens, a zoom lens including, from an object side to an image side, four units, that is, first to fourth units in that order is known (refer to U.S. Pat. Nos. 5,963,378 and 6,166,864). The first unit has a positive refractive power. The second unit has a negative refractive power. The third unit has a positive refractive power. The fourth unit has a positive refractive power. In the zoom lens including four units, the second unit is moved to change magnification, and the fourth unit is moved to perform focusing and displacement of an image field, resulting from a magnification change.

A zoom lens including, from an object side to an image side, five units, that is, first to fifth units in that order, is known (refer to Japanese Patent Laid-Open No. 2000-180724). The first unit has a positive refractive power. The second unit has a negative refractive power. The third unit has a positive refractive power. The fourth unit has a positive refractive power. The fifth unit has a positive refractive power.

In the zoom lens including five units, the second unit is moved to change magnification, and the fifth unit is moved to perform focusing.

Another type of zoom lens is proposed (refer to US Patent No. 2004/0233302 and Japanese Patent Laid-Open No. 2004-102089). In the zoom lens, a reflecting member is disposed in an optical system of the zoom lens, and a light axis is deflected by substantially 90 degrees to restrict an optical thickness in an object-side direction (that is, a front-back direction of a camera), thereby achieving a thin camera.

US Patent No. 2004/0233302 discloses a thin zoom lens having high magnification, in which a light path is bent by a prism disposed in a first unit having a positive refractive power.

In the zoom lens discussed in US Patent No. 2004/0233302, during zooming, the first unit is stationary, and a second unit and subsequent units are moved by large amounts to achieve a high zoom ratio. Therefore, the distance from a prism to an image field is increased. Accordingly, although this structure is advantageous for reducing the thickness of an optical system, the entire camera tends to become large.

Japanese Patent Laid-Open No. 2004-102089 discloses a zoom lens which is compact and has a high magnification as a result of disposing a prism in a second unit having a negative refractive power, and bending a light path by the prism.

In the zoom lens discussed in Japanese Patent Laid-Open No. 2004-102089, considering, for example, that an effective diameter of a front lens is relatively large and that conditions placing limitations on the manufacturing of a lens exist, the entire optical system tends to be large.

SUMMARY OF THE INVENTION

According to an aspect of the present invention, a zoom lens includes, in order from an object side to an image side, a first optical unit having a positive refractive power, a second optical unit having a negative refractive power, a third optical unit including an aperture, a fourth optical unit having a positive refractive power, and a fifth optical unit having a positive refractive power. The second optical unit includes a negative lens member and a prism in that order from the object side to the image side, and is stationary during zooming. When the zooming is performed from a wide-angle end to a telephoto end, the first, third, and fourth optical units are moved so that a distance between the first optical unit and the second optical unit is increased, a distance between the second optical unit and the third optical unit is reduced, and a distance between the third optical unit and the fourth optical unit is reduced. The zoom lens satisfies the following conditions:

$$0.20 < |f2|/\sqrt{(fW \cdot fT)} < 0.45$$

$$0.80 < |fN/fW| < 1.90$$

$$2.70 < L/fW < 4.20$$

where fw and fT represent focal lengths of an entire system at the wide-angle end and the telephoto end, respectively, f2 represents a focal length of the second optical unit, fN represents a focal length of the negative lens member, a length of the prism in a light-axis direction is an air conversion length, and L represents a distance on the light axis from a lens surface of the second optical unit closest to the object side to the aperture at the wide-angle end.

Further features of the present invention will become apparent from the following description of exemplary embodiments with reference to the attached drawings.

DESCRIPTION OF THE EMBODIMENTS

Embodiments of the present invention provide zoom lenses and an image pickup apparatus including any of these zoom lenses. Each zoom lens uses a light-path bending prism in an optical system, is small, and provides a high optical performance at a high zoom ratio and over an entire zooming range. Such zoom lenses and an optical apparatus, such as the image pickup apparatus, will be described in detail with reference to the drawings.

Exemplary Embodiments

Exemplary embodiments of zoom lenses and an image pickup apparatus including the same according to the present invention will hereunder be described.

Figure 1:
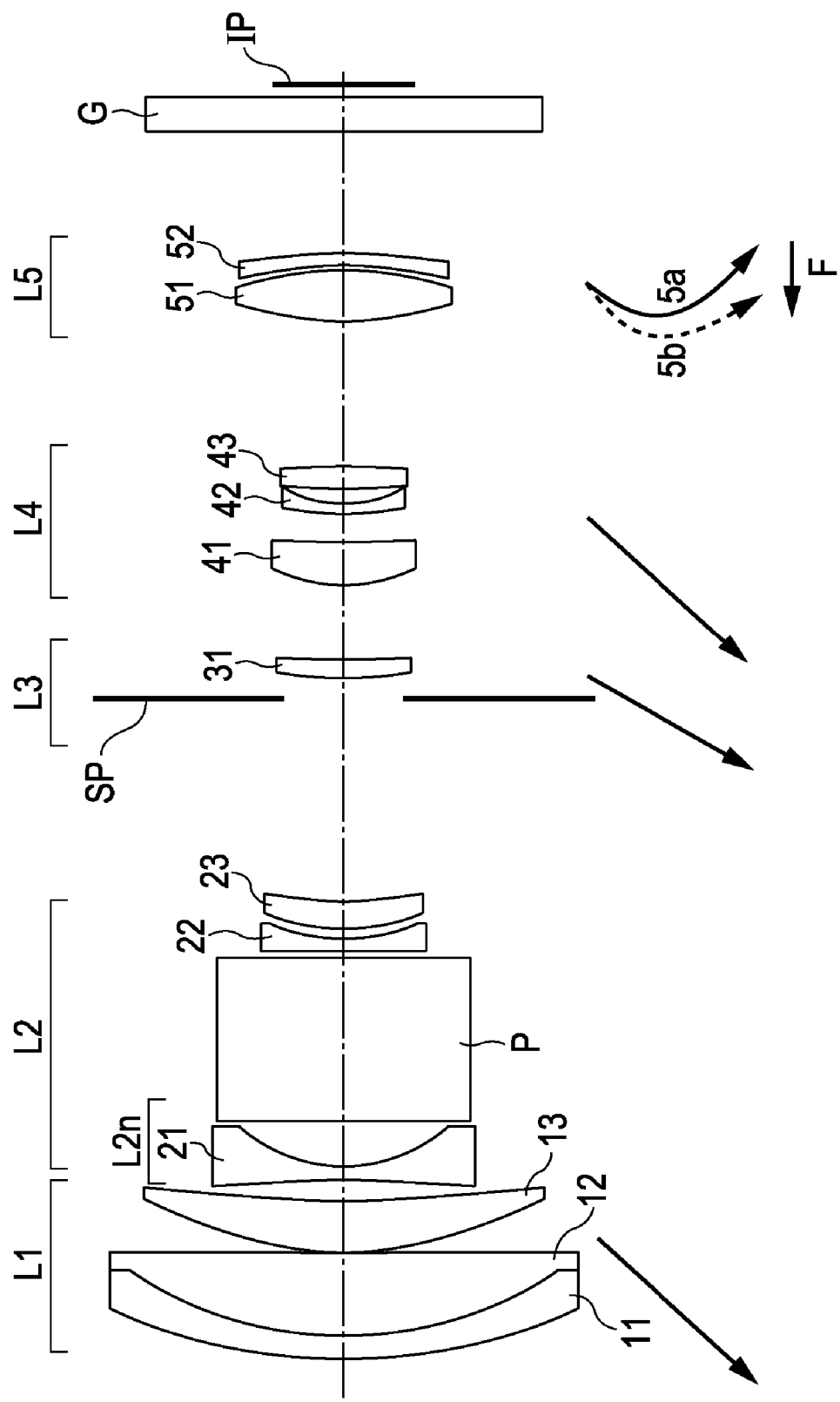
FIG. 1 is a sectional view of a zoom lens according to a first embodiment at a wide-angle end.
Figure 2:
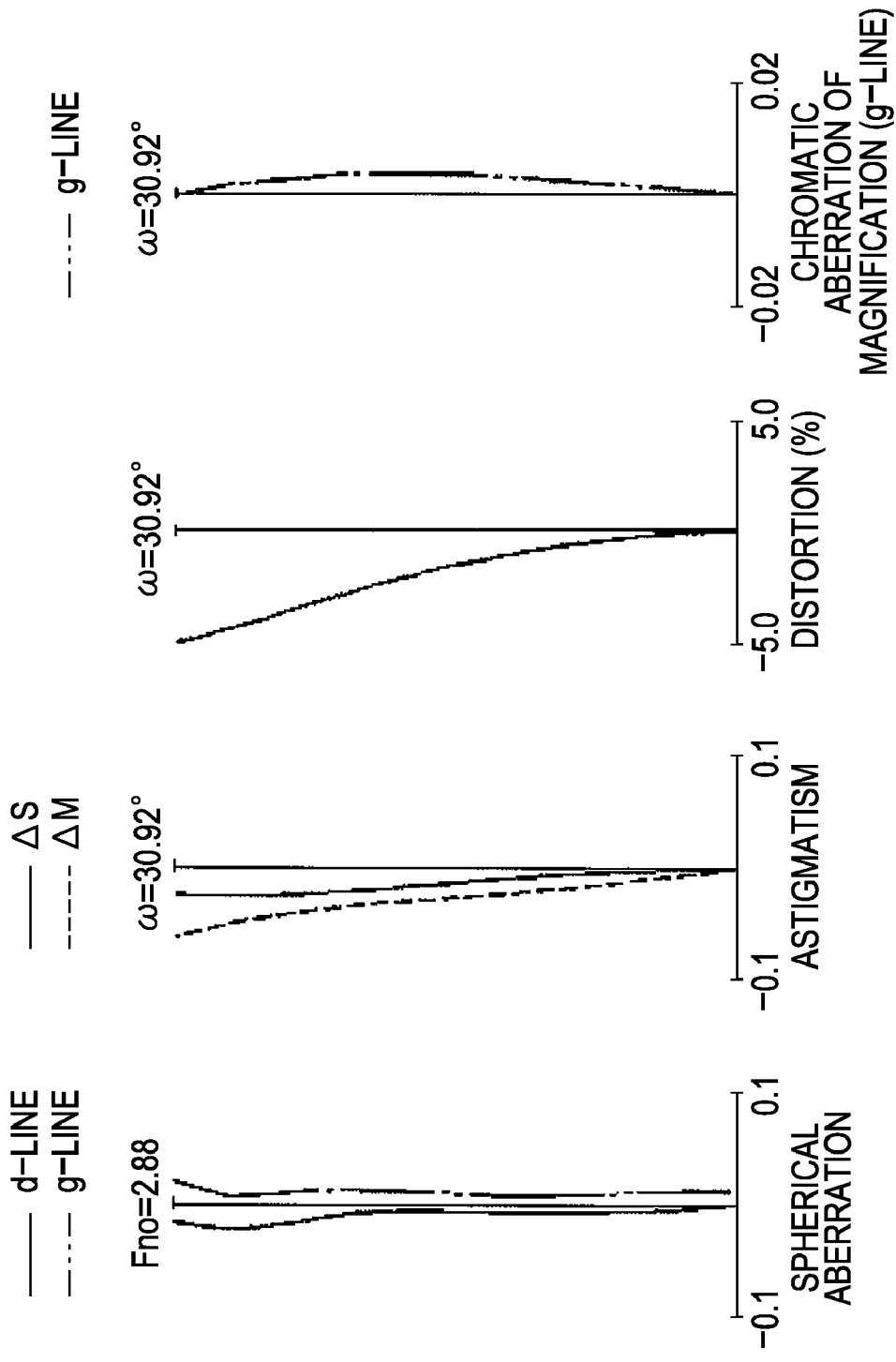
FIG. 2 illustrates various aberrations at the wide-angle end of the zoom lens according to the first embodiment.
Figure 3:
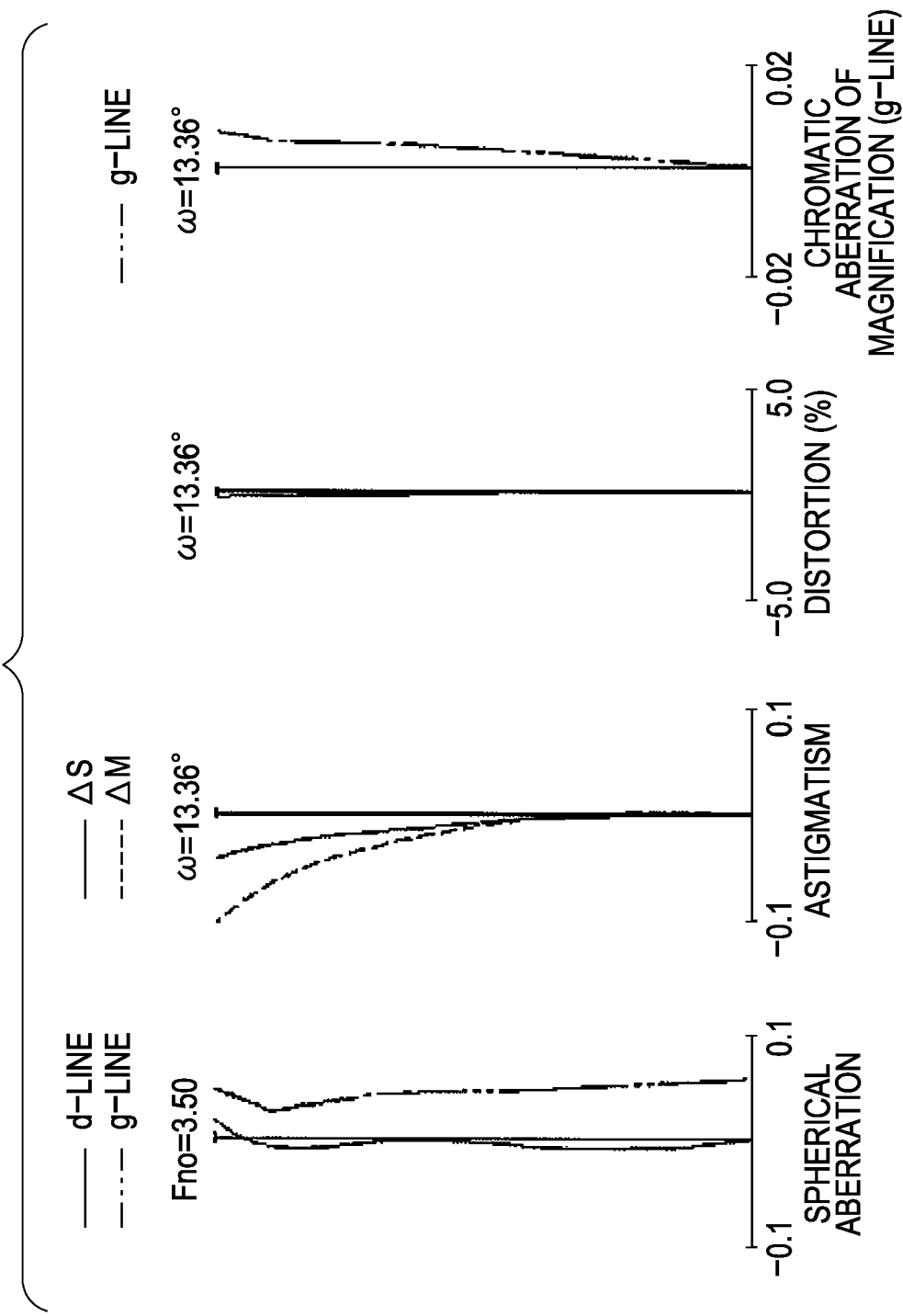
FIG. 3 illustrates various aberrations at a zooming position at an intermediate portion of the zoom lens according to the first embodiment.
Figure 4:
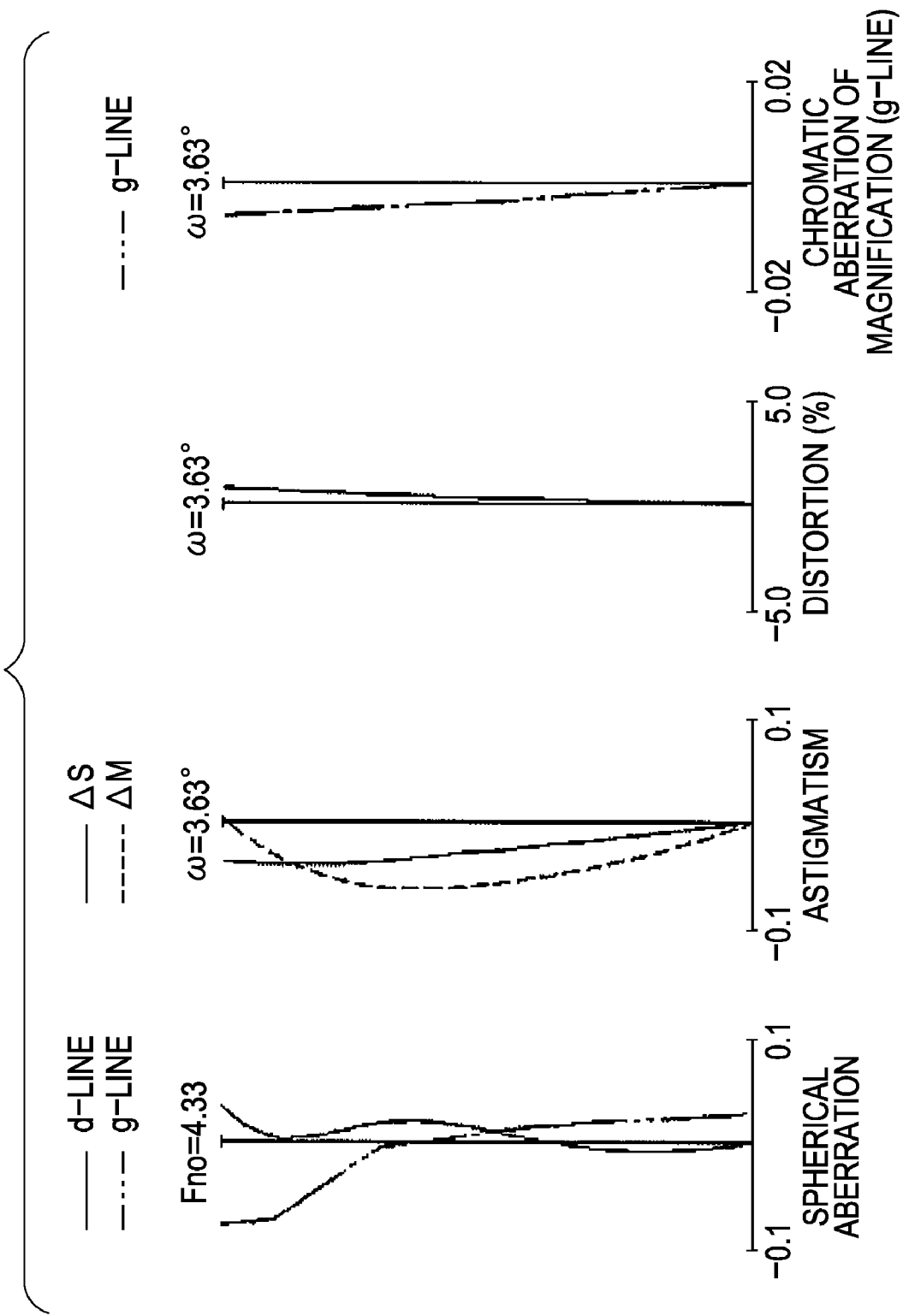
FIG. 4 illustrates various aberrations at a telephoto end of the zoom lens according to the first embodiment.

FIG. 1 is a sectional view of a zoom lens according to a first embodiment of the present invention at a wide-angle end (short focal-length end) when a light path of the zoom lens is extended. FIGS. 2, 3, and 4 illustrate aberrations at the wide-angle end, a zooming position (at an intermediate portion of the zoom lens), and a telephoto end (long focal-length end) of the zoom lens according to the first embodiment, respectively.

Figure 5:
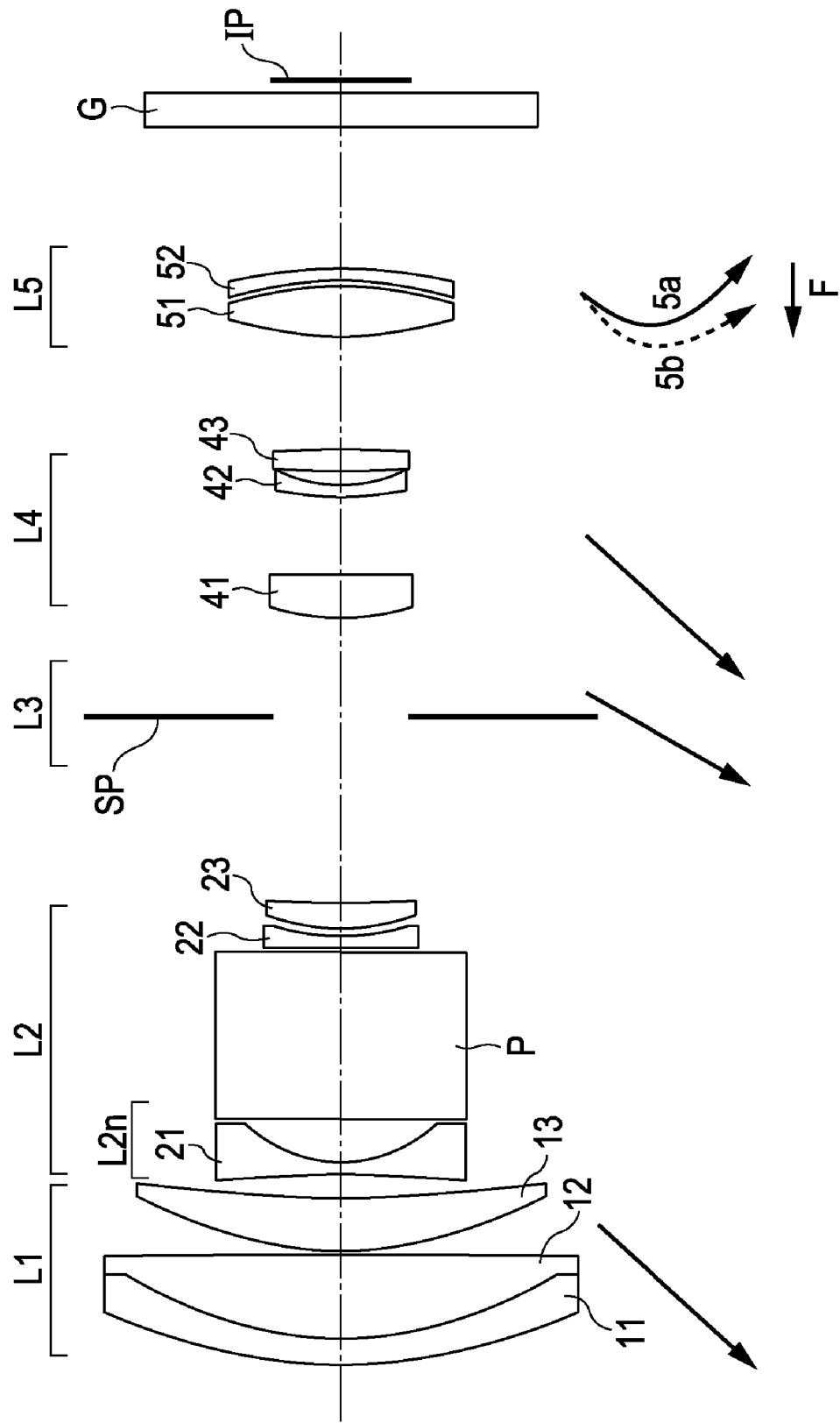
FIG. 5 is a sectional view of a zoom lens according to a second embodiment at a wide-angle end.
Figure 6:
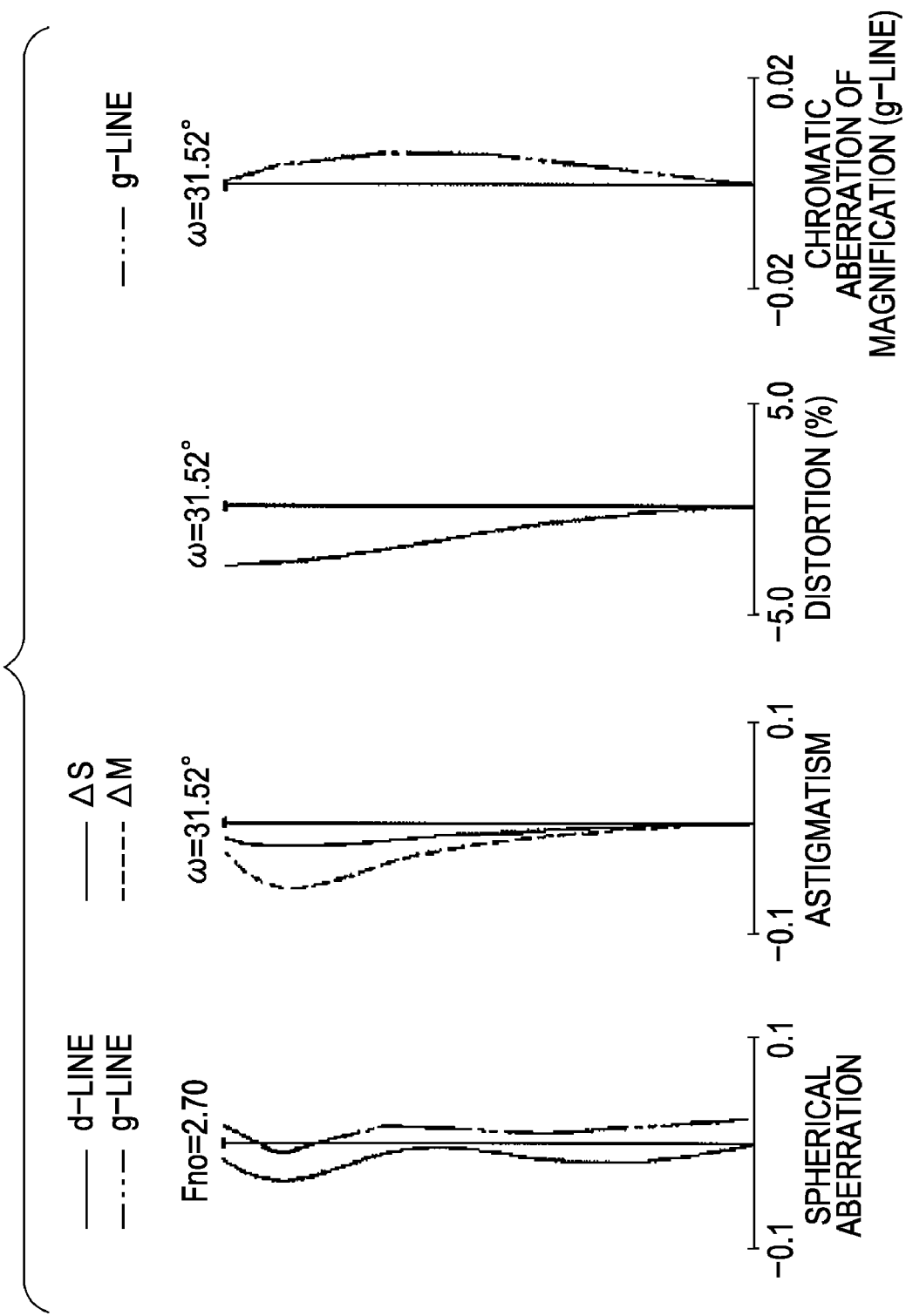
FIG. 6 illustrates various aberrations at the wide-angle end of the zoom lens according to the second embodiment.
Figure 7:
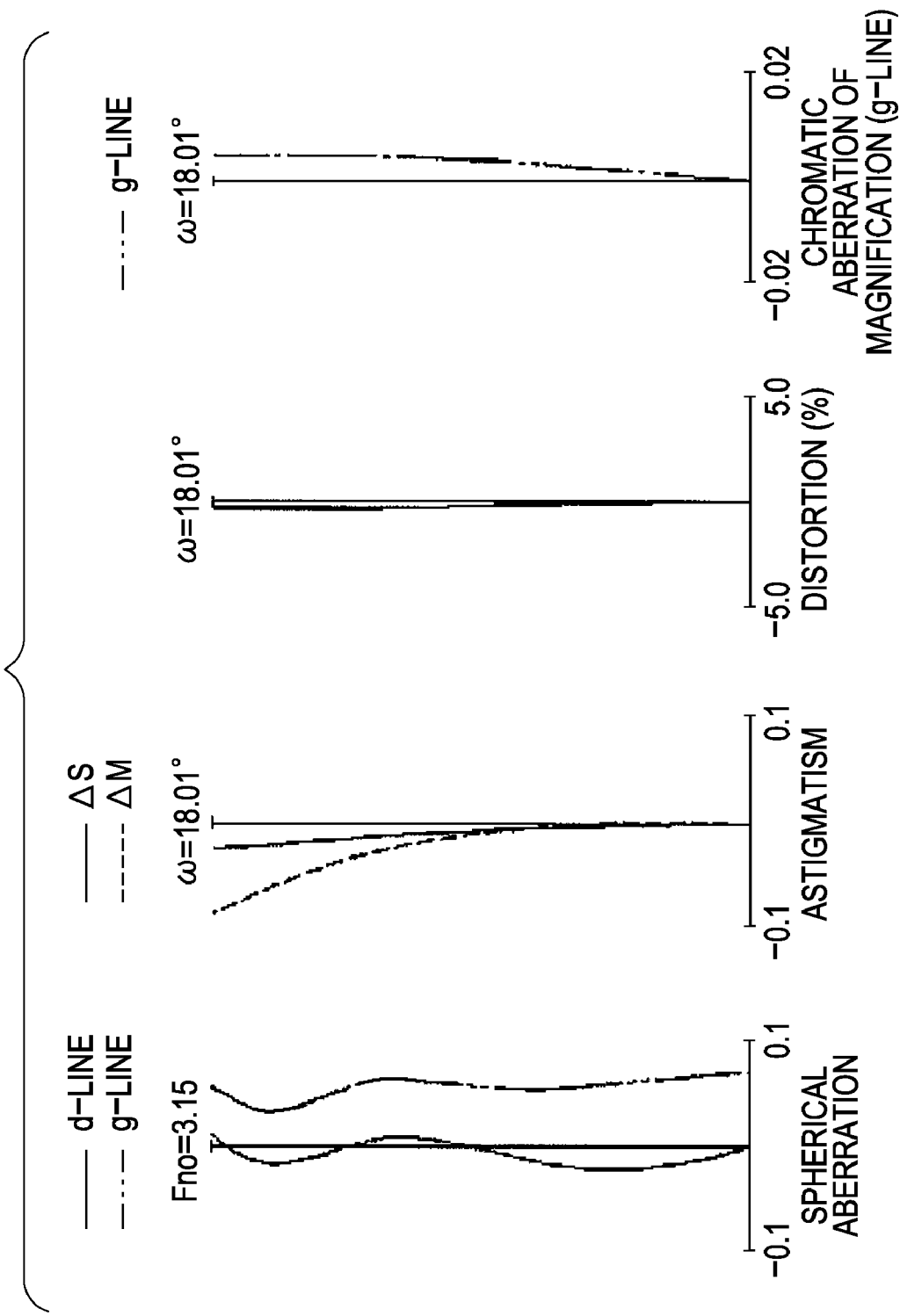
FIG. 7 illustrates various aberrations at a zooming position at an intermediate portion of the zoom lens according to the second embodiment.
Figure 8:
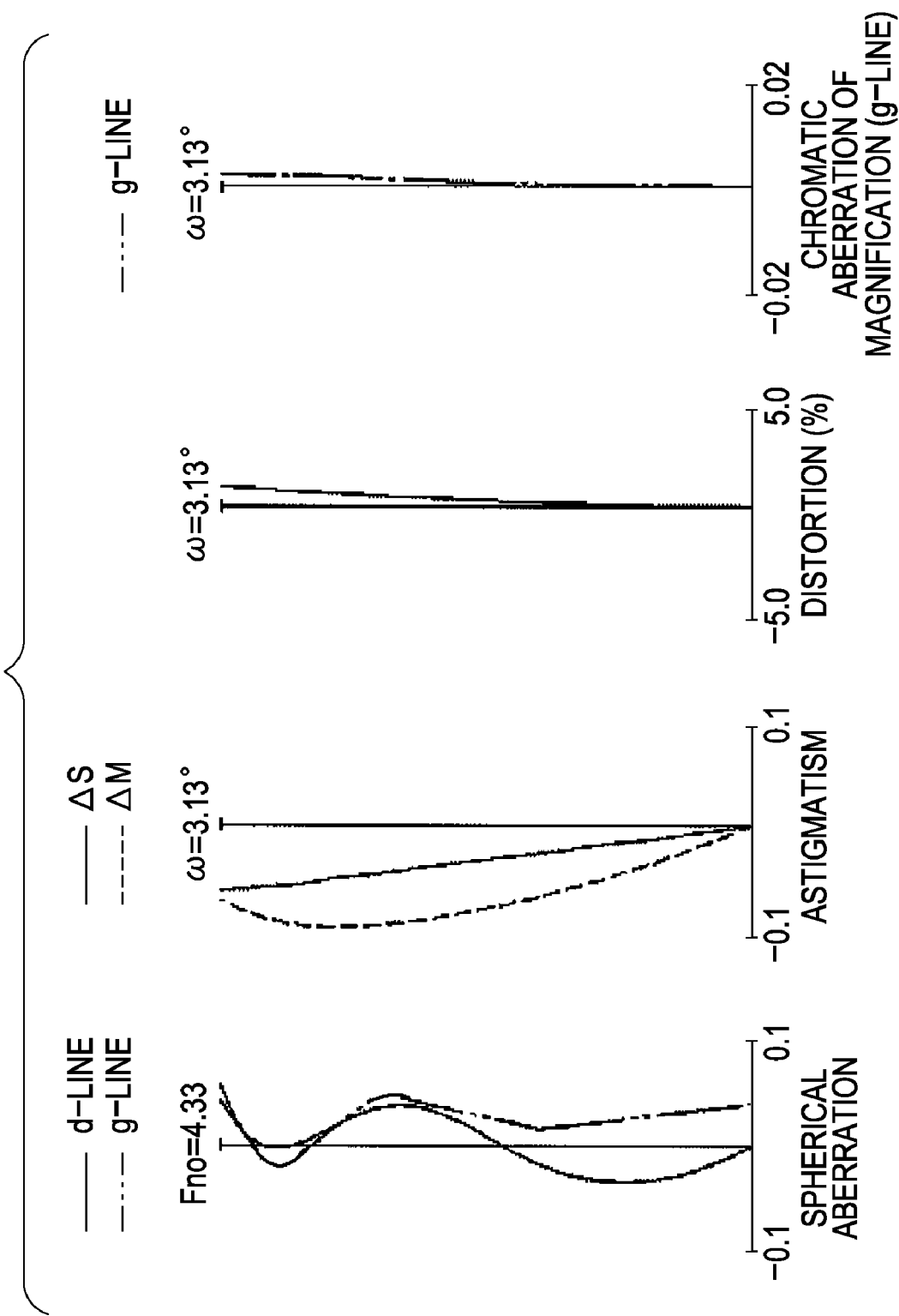
FIG. 8 illustrates various aberrations at a telephoto end of the zoom lens according to the second embodiment.

FIG. 5 is a sectional view of a zoom lens according to a second embodiment of the present invention at a wide-angle end when a light path of the zoom lens is extended. FIGS. 6, 7, and 8 illustrate aberrations at the wide-angle end, a zooming position (at an intermediate portion of the zoom lens), and a telephoto end of the zoom lens according to the second embodiment, respectively.

Figure 9:
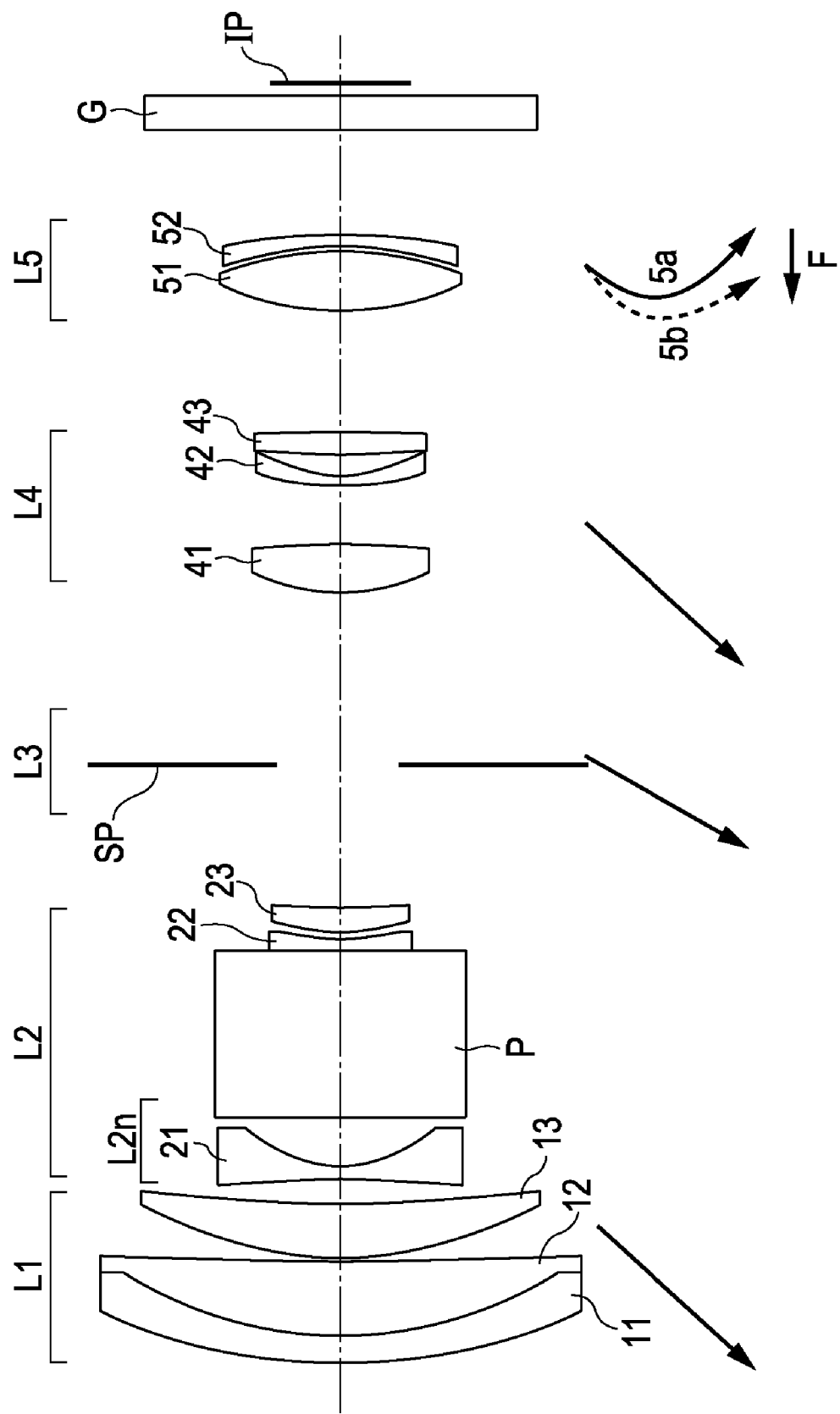
FIG. 9 is a sectional view of a zoom lens according to a third embodiment at a wide-angle end.
Figure 10:
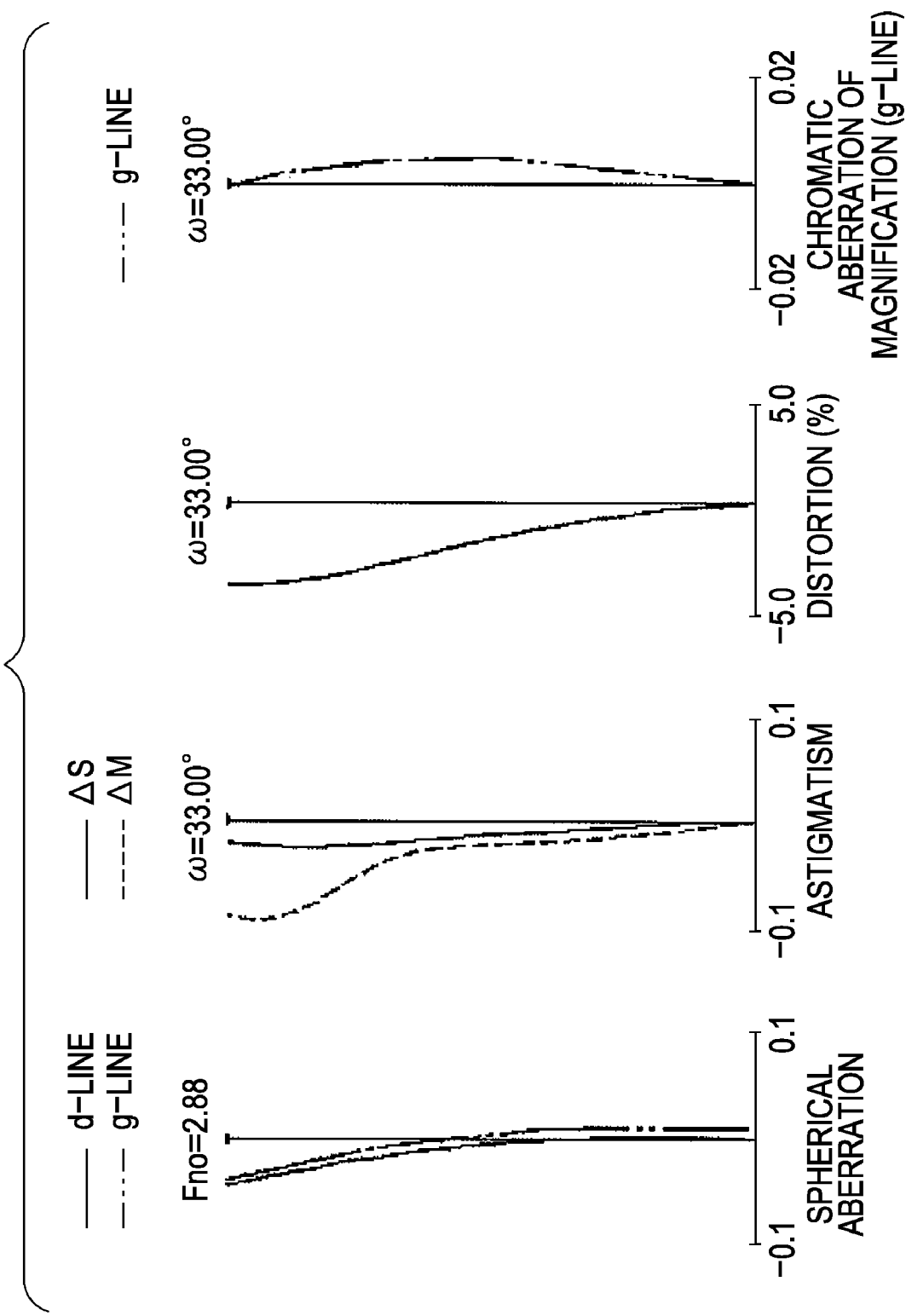
FIG. 10 illustrates various aberrations at the wide-angle end of the zoom lens according to the third embodiment.
Figure 11:
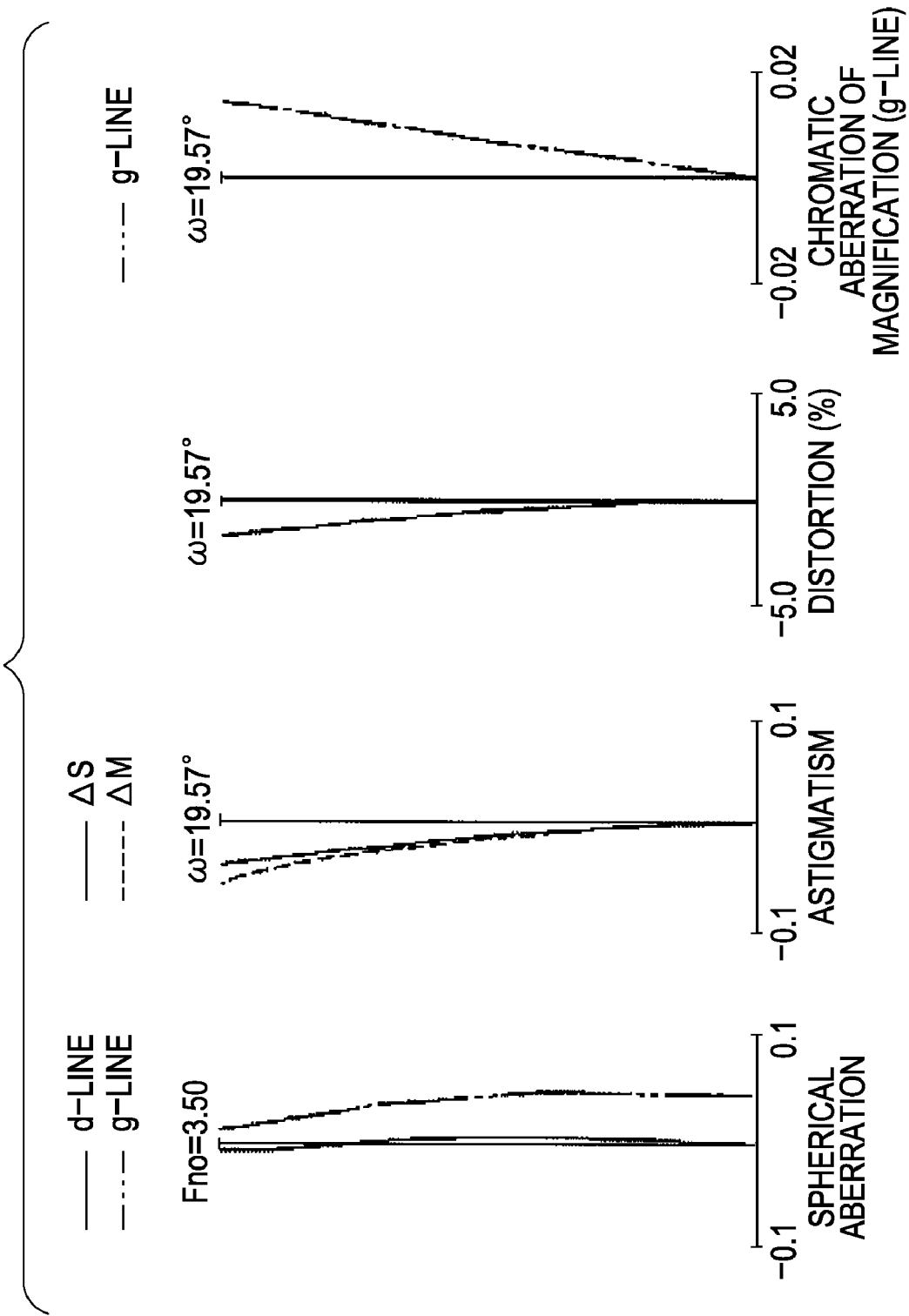
FIG. 11 illustrates various aberrations at a zooming position at an intermediate portion of the zoom lens according to the third embodiment.
Figure 12:
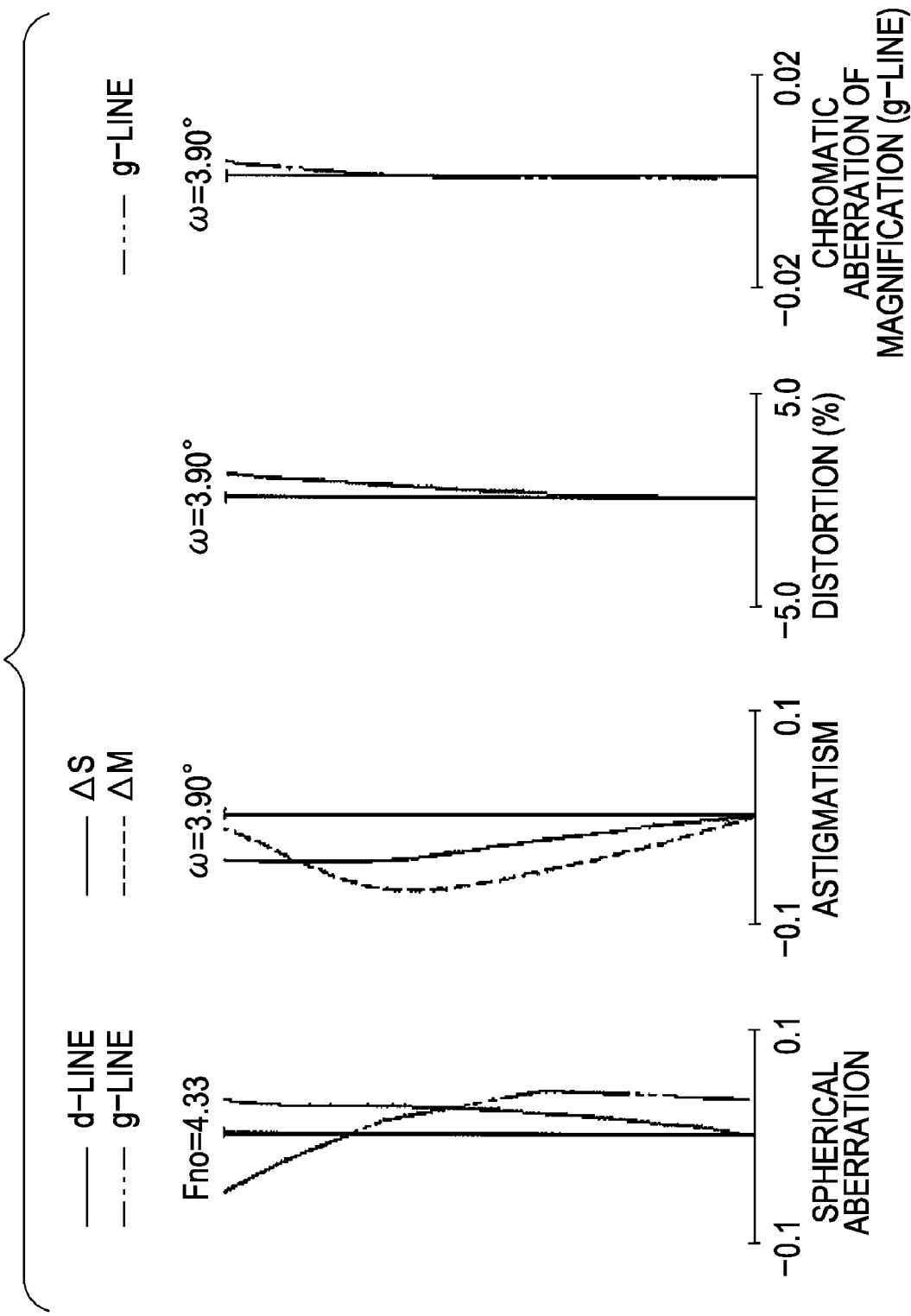
FIG. 12 illustrates various aberrations at a telephoto end of the zoom lens according to the third embodiment.

FIG. 9 is a sectional view of a zoom lens according to a third embodiment of the present invention at a wide-angle end when a light path of the zoom lens is extended. FIGS. 10, 11, and 12 illustrate aberrations at the wide-angle end, a zooming position (at an intermediate portion of the zoom lens), and a telephoto end of the zoom lens according to the third embodiment, respectively.

Figure 13:
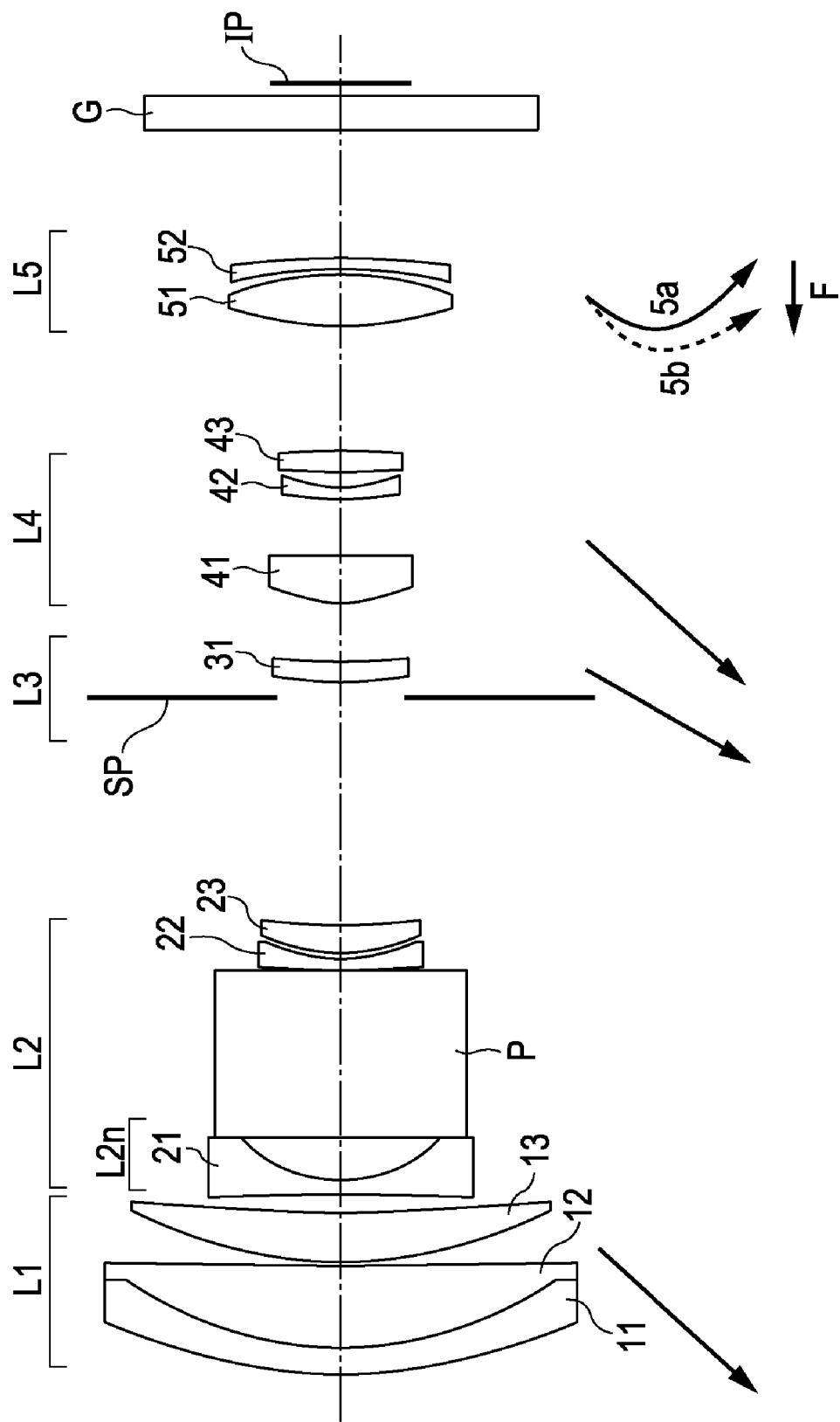
FIG. 13 is a sectional view of a zoom lens according to a fourth embodiment at a wide-angle end.
Figure 14:
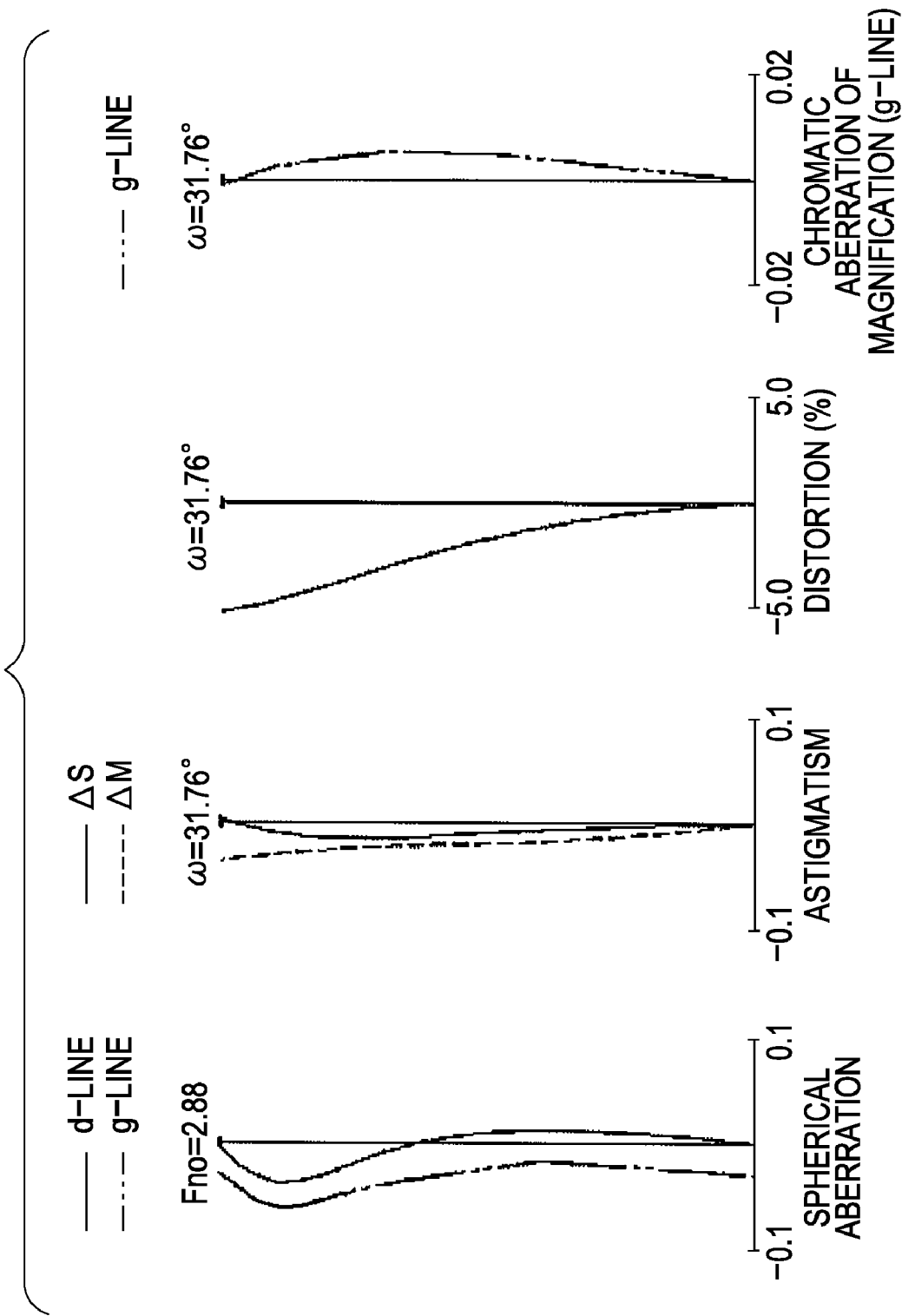
FIG. 14 illustrates various aberrations at the wide-angle end of the zoom lens according to the fourth embodiment.
Figure 15:
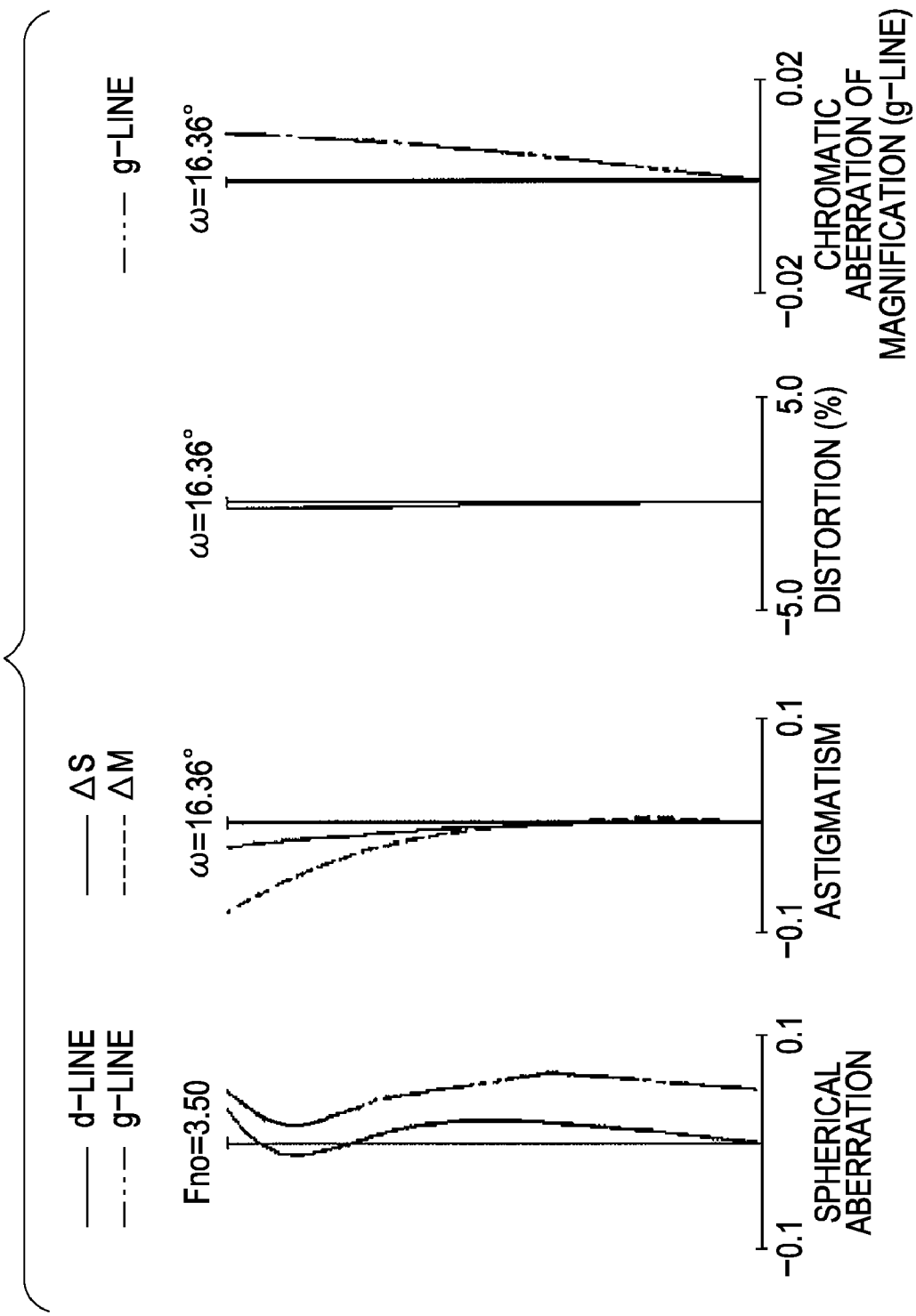
FIG. 15 illustrates various aberrations at a zooming position at an intermediate portion of the zoom lens according to the fourth embodiment.
Figure 16:
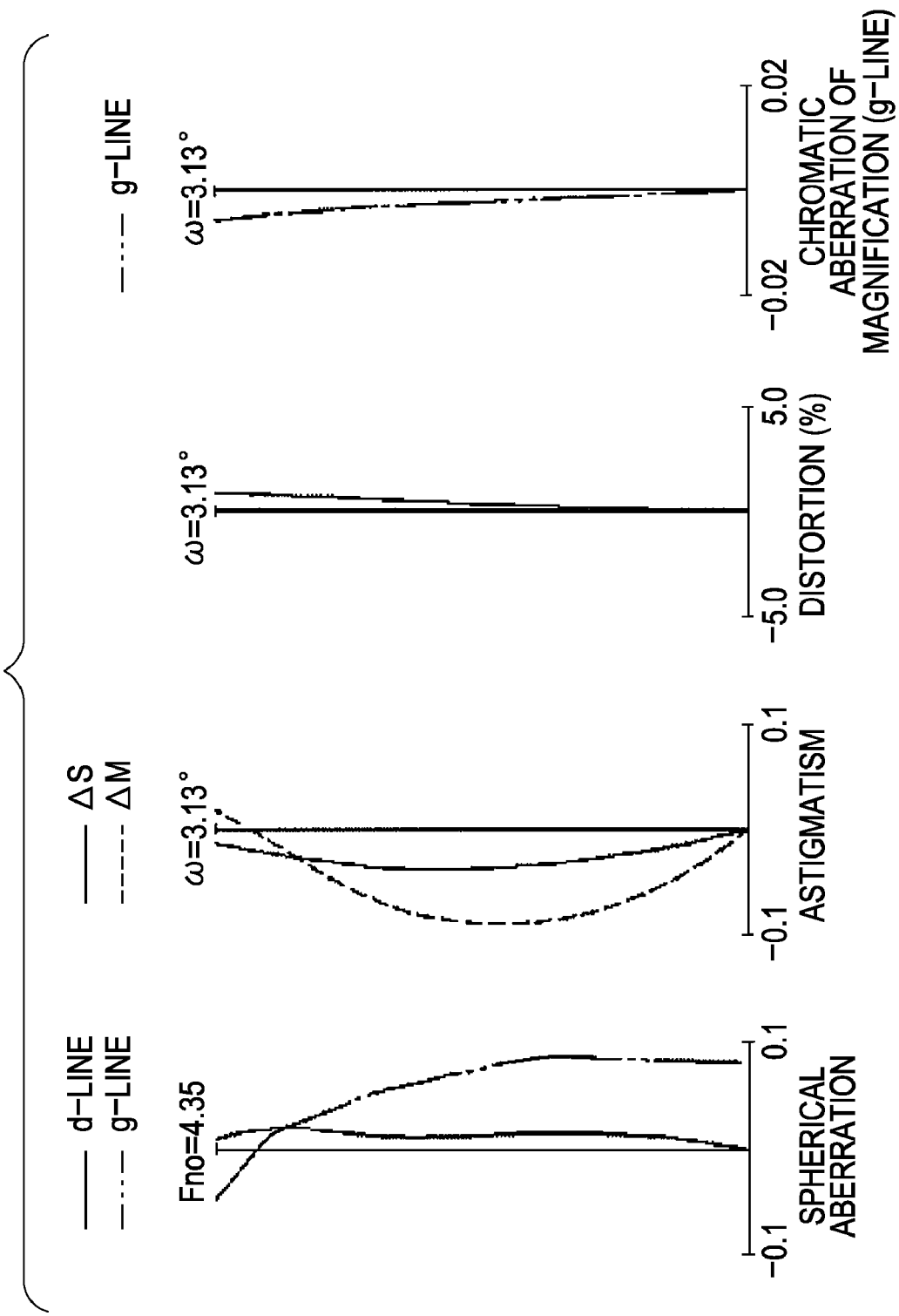
FIG. 16 illustrates various aberrations at a telephoto end of the zoom lens according to the fourth embodiment.

FIG. 13 is a sectional view of a zoom lens according to a fourth embodiment of the present invention at a wide-angle end when a light path of the zoom lens is extended. FIGS. 14, 15, and 16 illustrate aberrations at the wide-angle end, a zooming position (at an intermediate portion of the zoom lens), and a telephoto end of the zoom lens according to the fourth embodiment, respectively.

Figure 17:
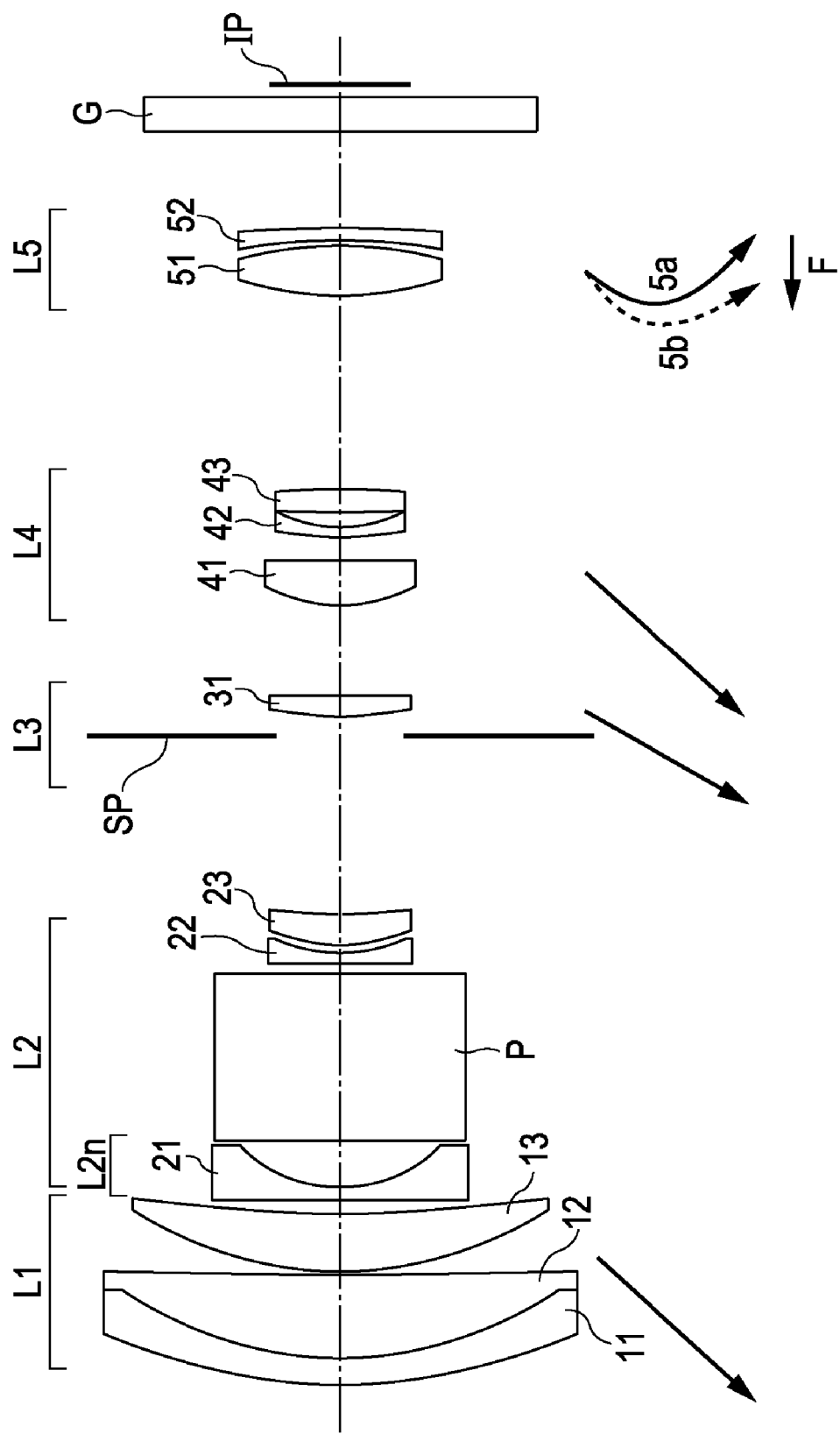
FIG. 17 is a sectional view of a zoom lens according to a fifth embodiment at a wide-angle end.
Figure 18:
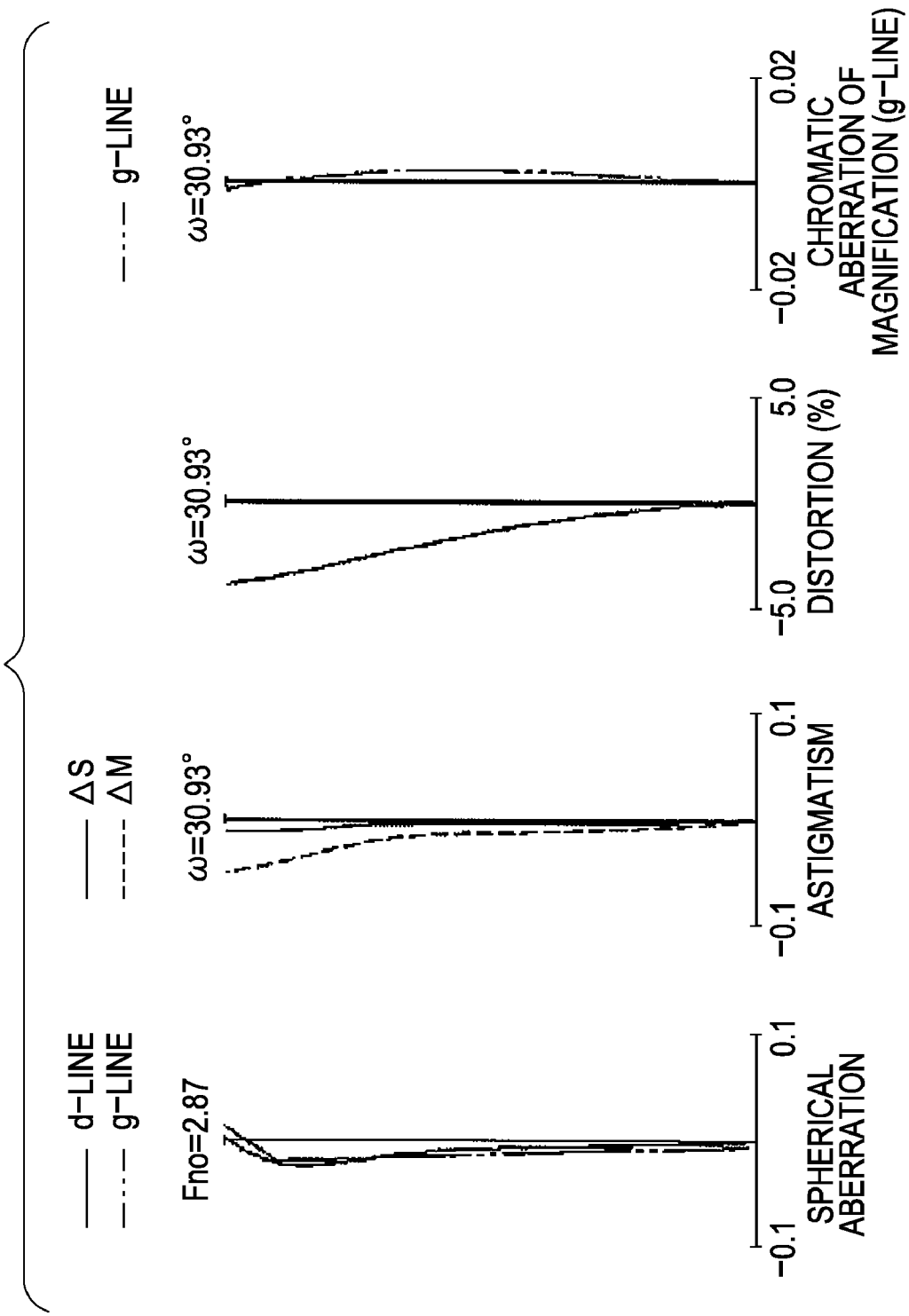
FIG. 18 illustrates various aberrations at the wide-angle end of the zoom lens according to the fifth embodiment.
Figure 19:
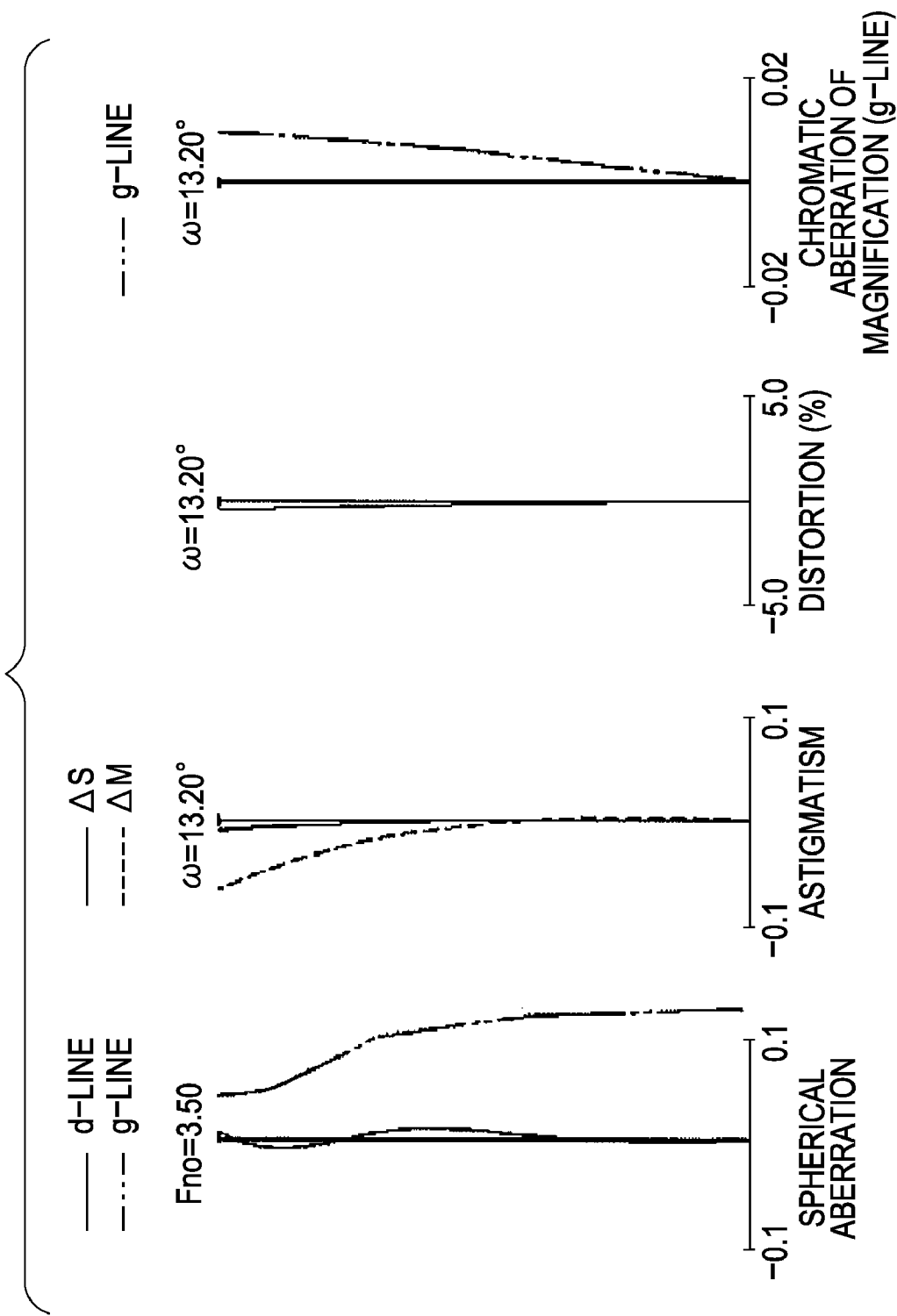
FIG. 19 illustrates various aberrations at a zooming position at an intermediate portion of the zoom lens according to the fifth embodiment.
Figure 20:
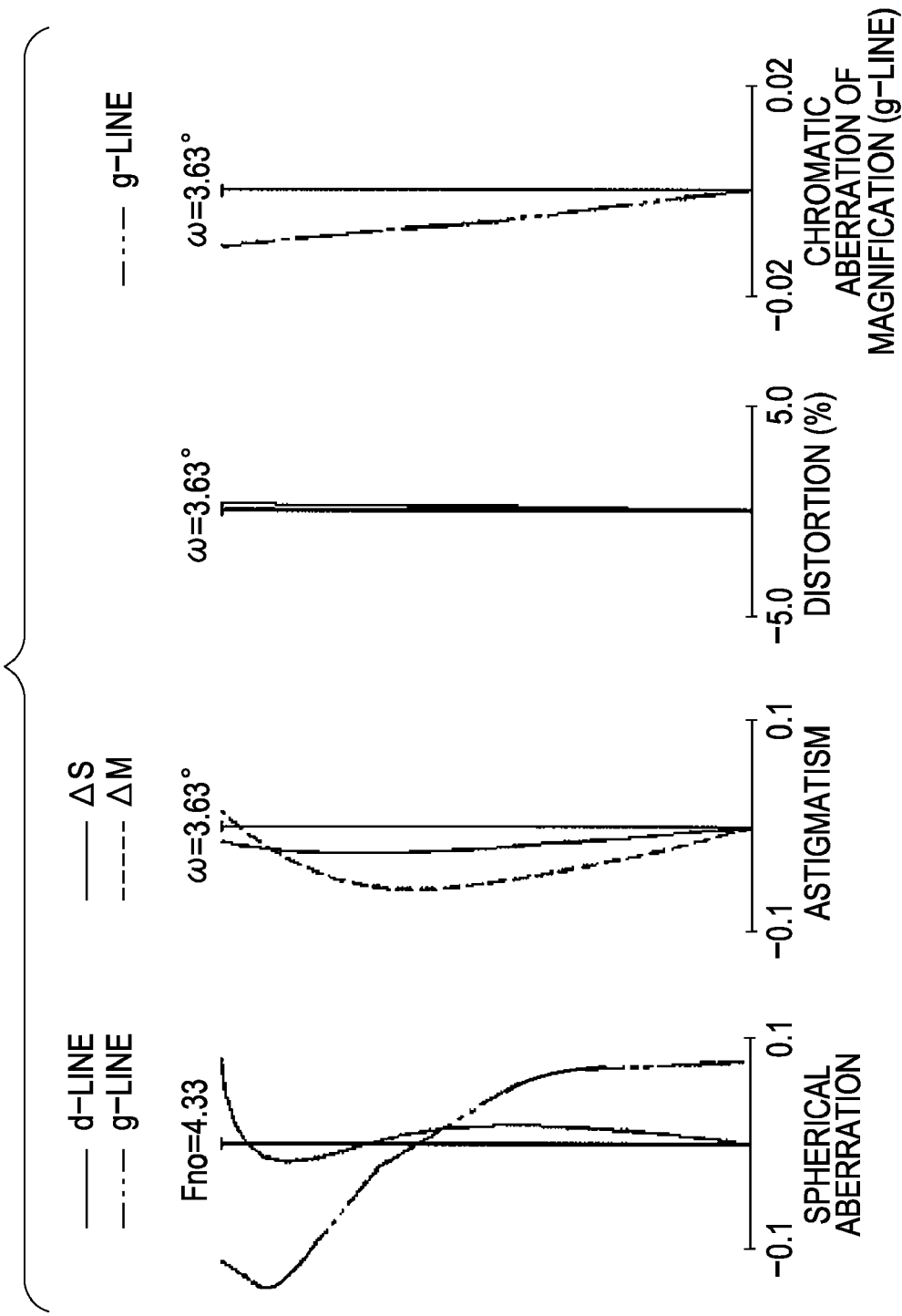
FIG. 20 illustrates various aberrations at a telephoto end of the zoom lens according to the fifth embodiment.

FIG. 17 is a sectional view of a zoom lens according to a fifth embodiment of the present invention at a wide-angle end when a light path of the zoom lens is extended. FIGS. 18, 19, and 20 illustrate aberrations at the wide-angle end, a zooming position (at an intermediate portion of the zoom lens), and a telephoto end of the zoom lens according to the fifth embodiment, respectively.

Figure 21:
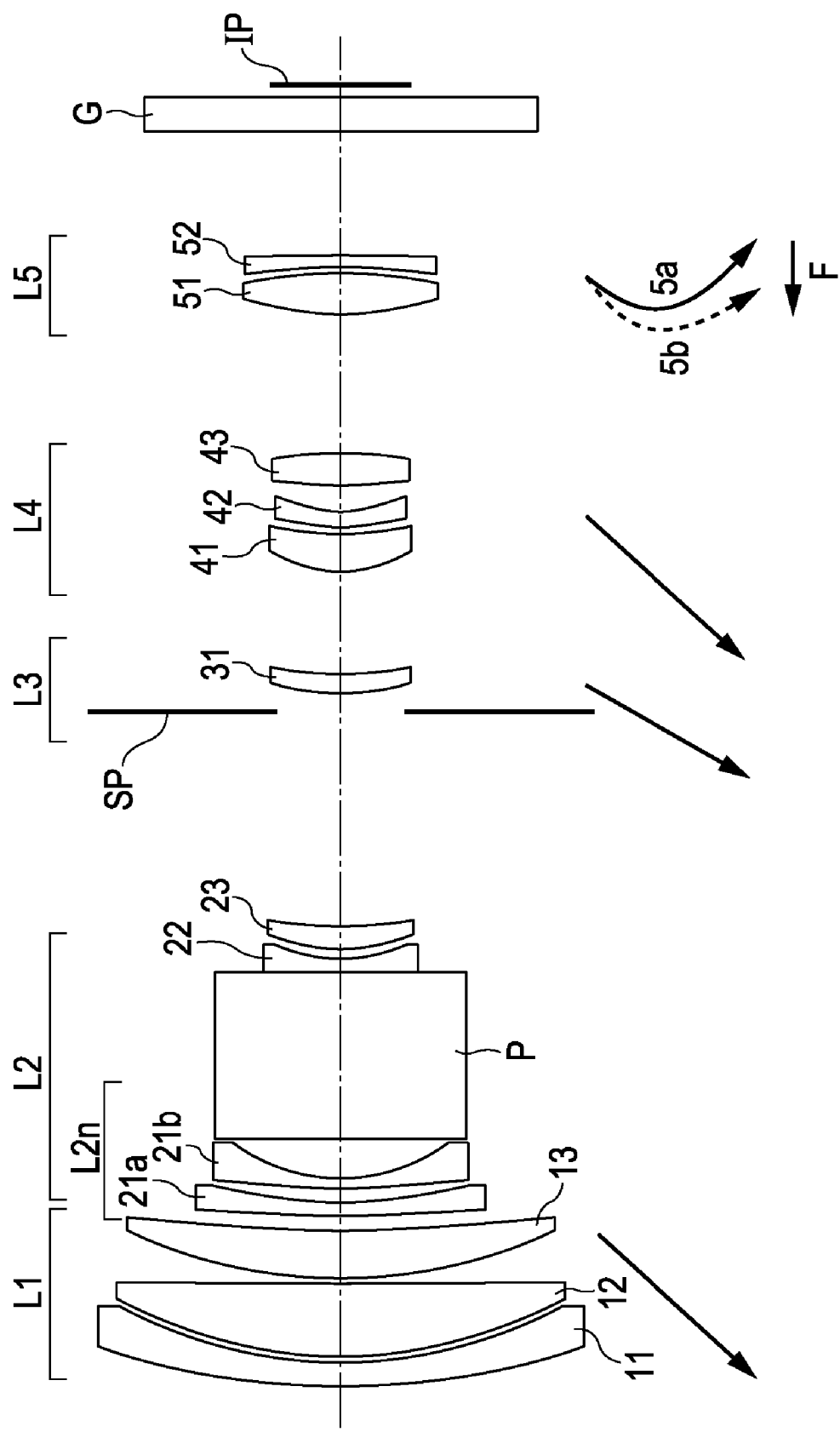
FIG. 21 is a sectional view of a zoom lens according to a sixth embodiment at a wide-angle end.
Figure 22:
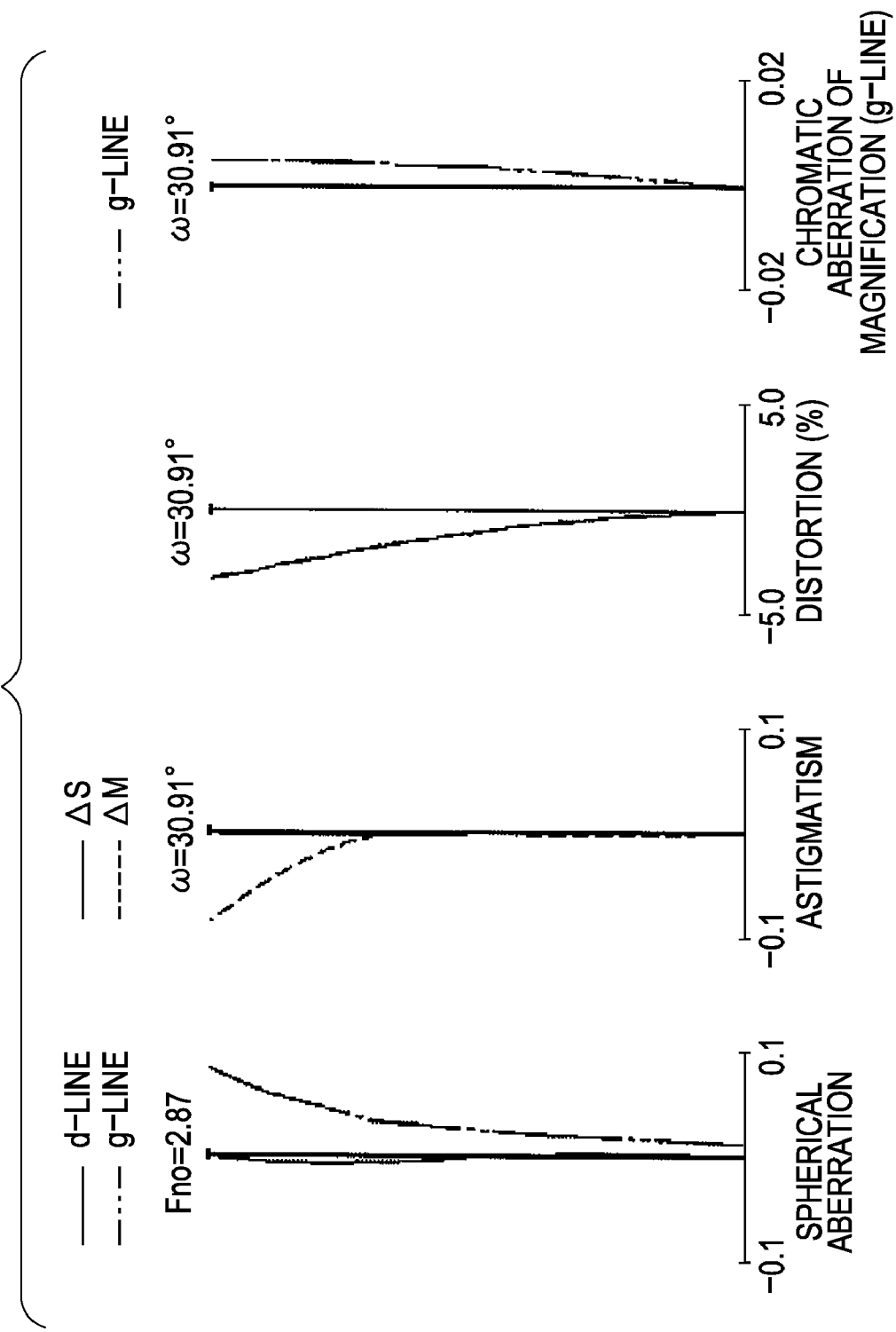
FIG. 22 illustrates various aberrations at the wide-angle end of the zoom lens according to the sixth embodiment.
Figure 23:
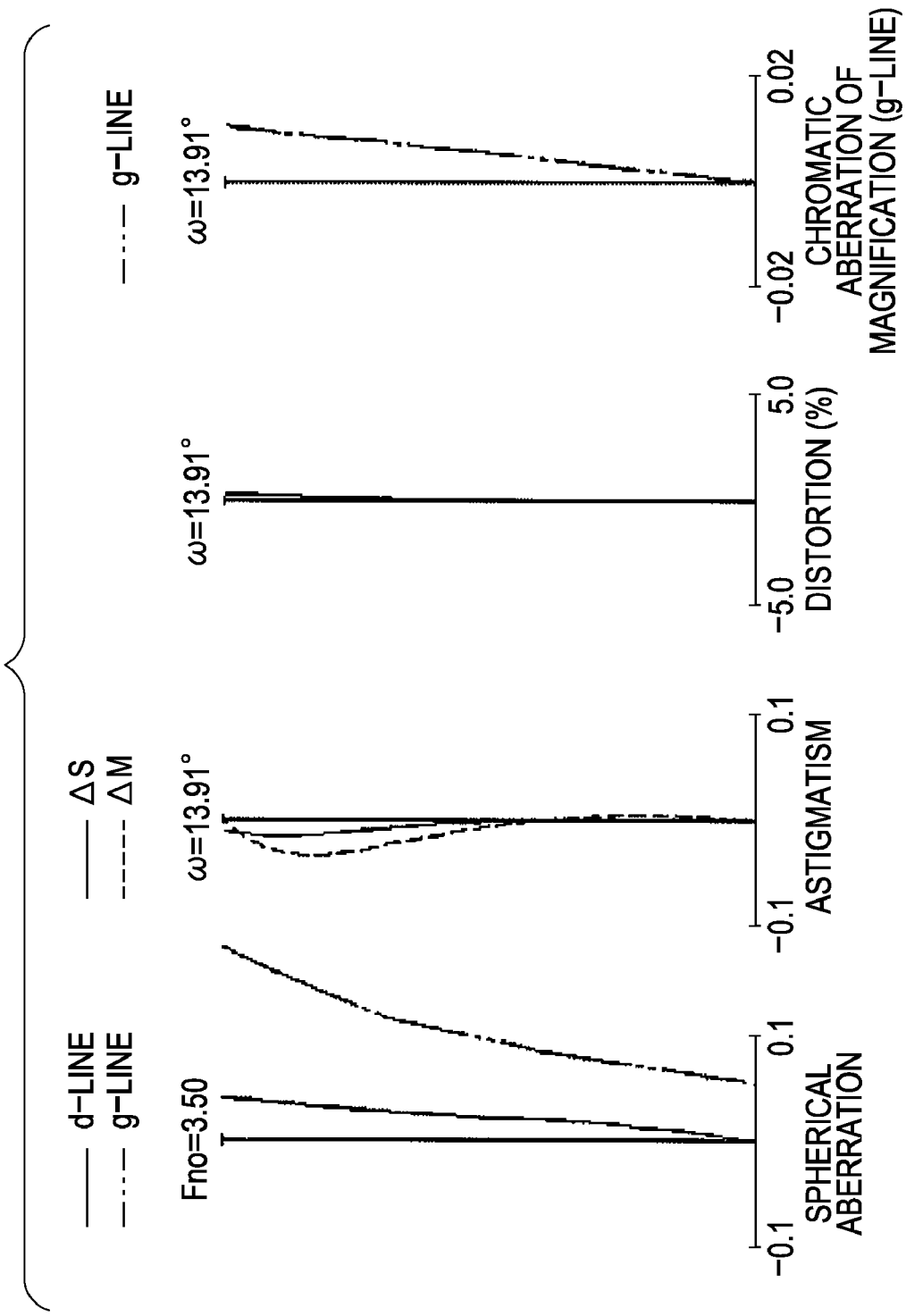
FIG. 23 illustrates various aberrations at a zooming position at an intermediate portion of the zoom lens according to the sixth embodiment.
Figure 24:
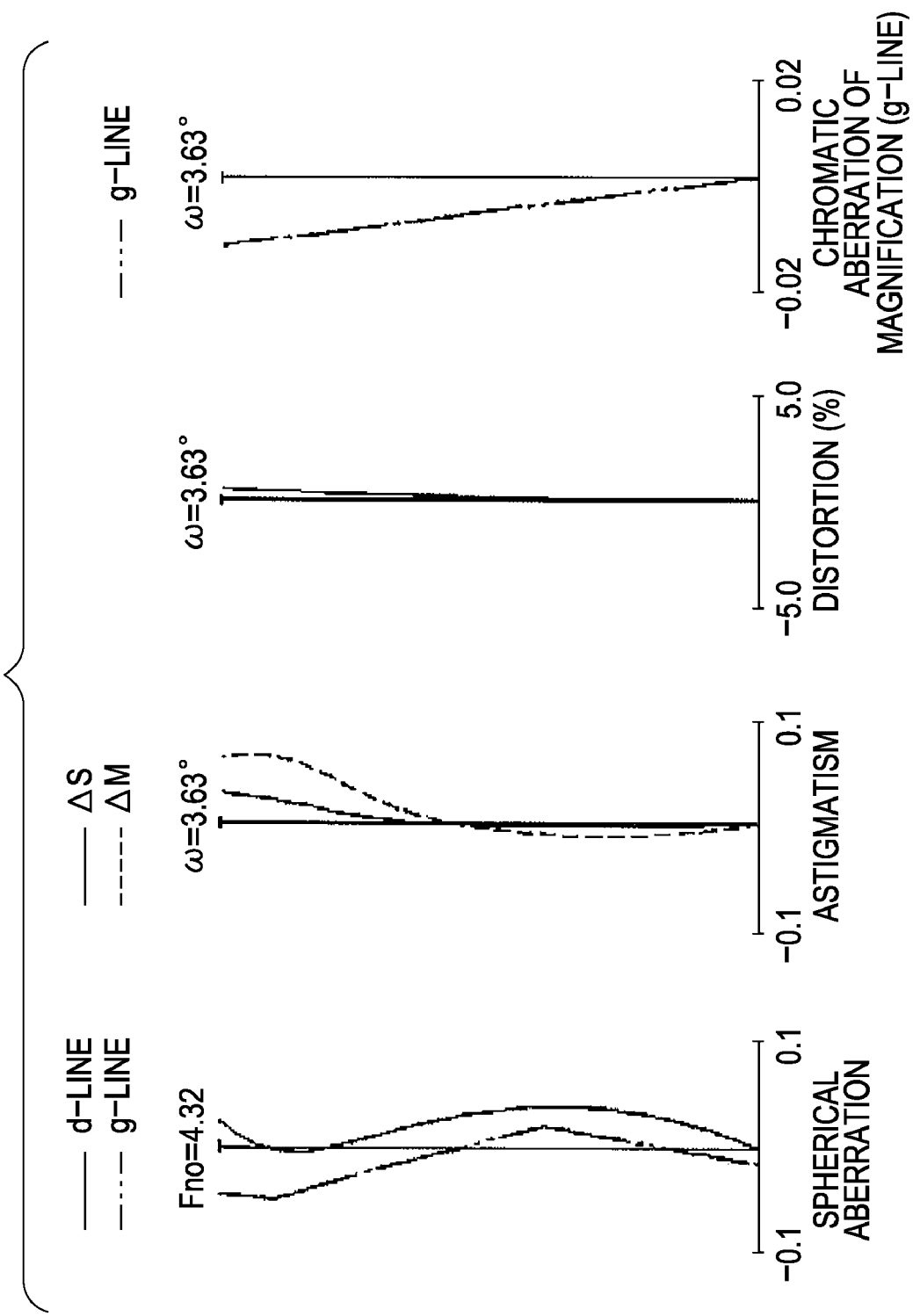
FIG. 24 illustrates various aberrations at a telephoto end of the zoom lens according to the sixth embodiment.

FIG. 21 is a sectional view of a zoom lens according to a sixth embodiment of the present invention at a wide-angle end when a light path of the zoom lens is extended. FIGS. 22, 23, and 24 illustrate aberrations at the wide-angle end, a zooming position (at an intermediate portion of the zoom lens), and a telephoto end of the zoom lens according to the sixth embodiment, respectively.

Figure 25:
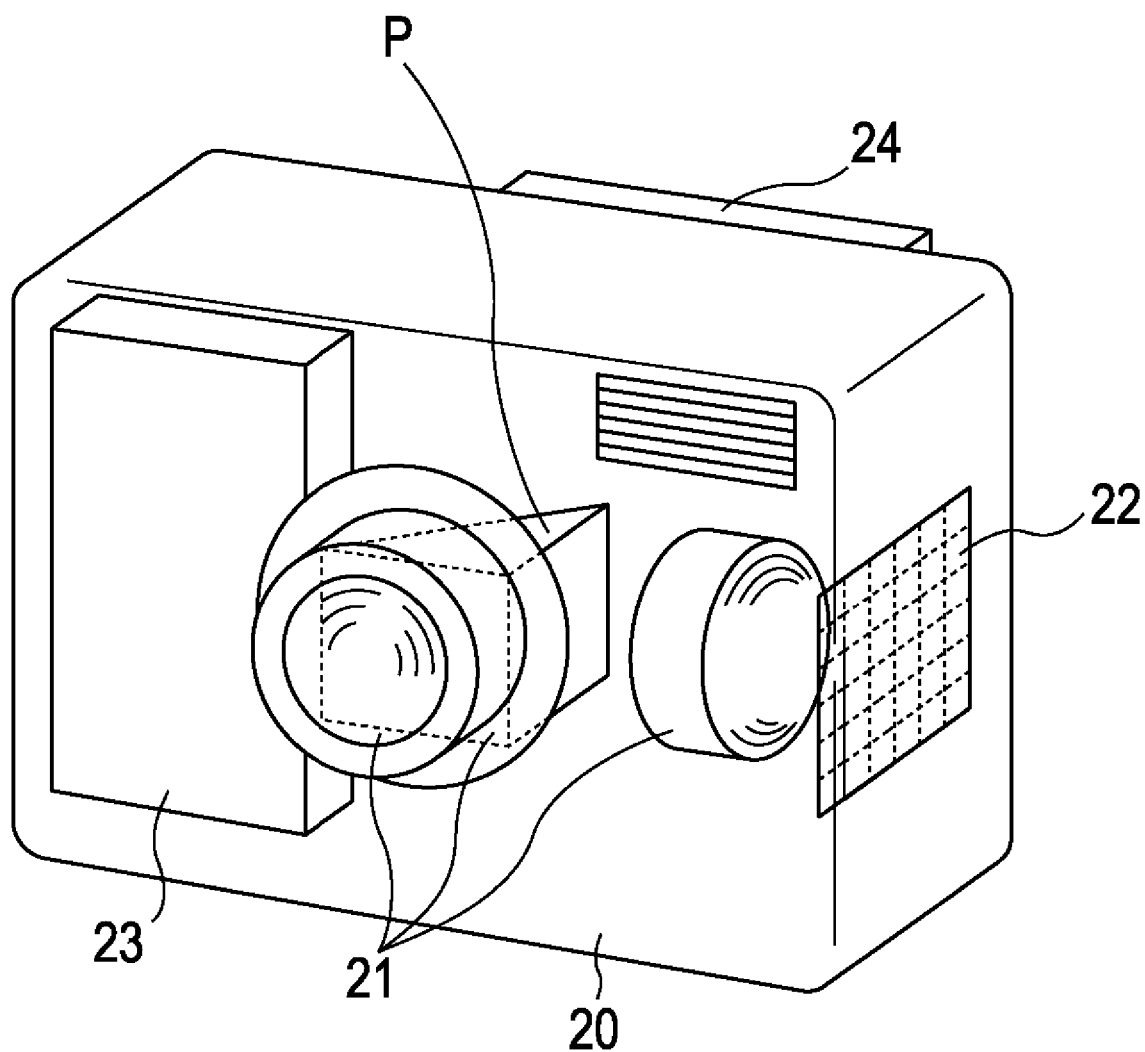
FIG. 25 is a schematic view of a main portion of an image pickup apparatus according to the present invention.

FIG. 25 is a schematic view of a main portion of a digital camera (image pickup apparatus) including a zoom lens according to the present invention.

Figure 26:
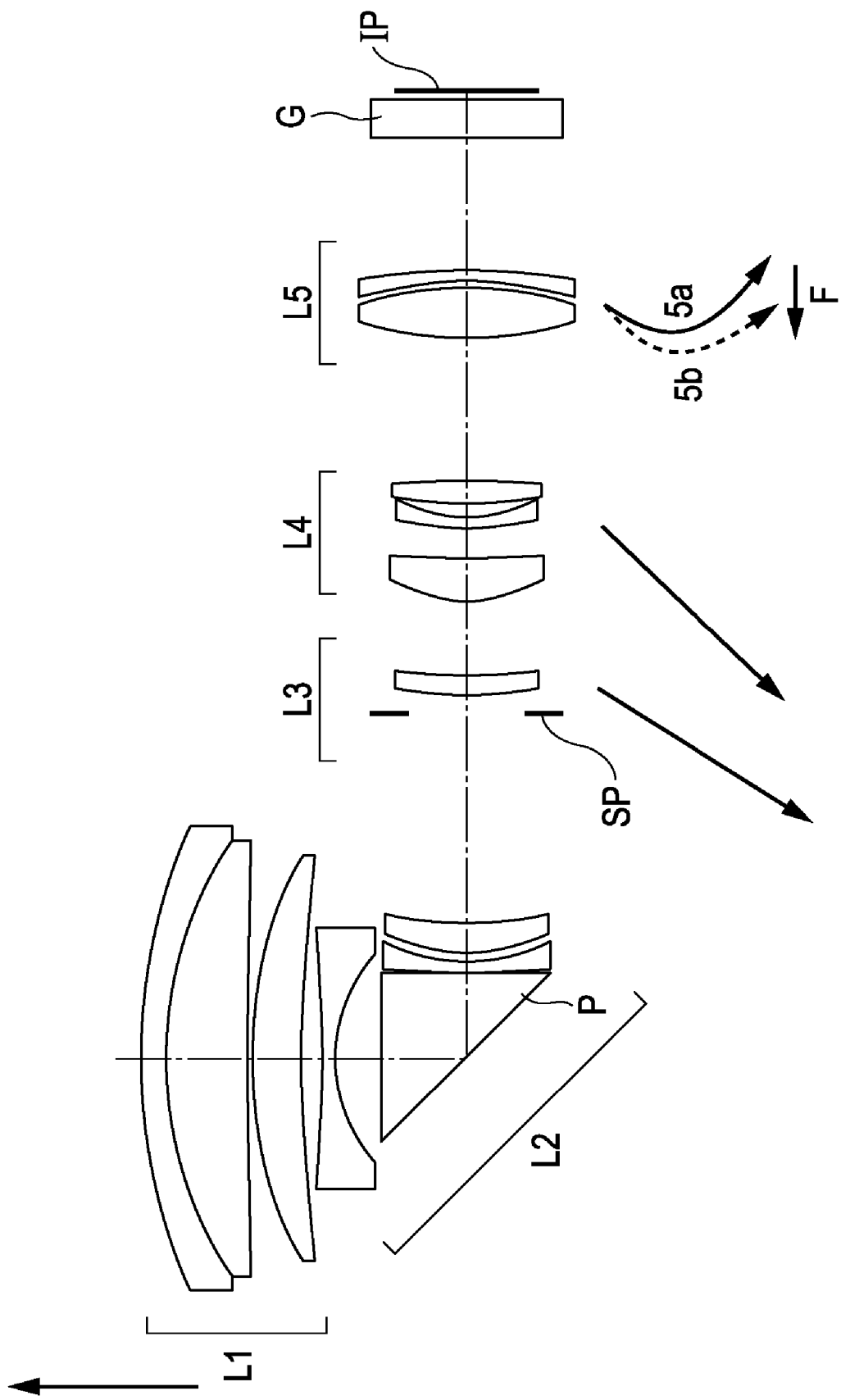
FIG. 26 is a sectional view of the zoom lens according to the present invention at the wide-angle end in which a light path is bent.

FIG. 26 is a sectional view of the zoom lens according to the first embodiment when it is mounted to a camera as a result of bending the light path of the zoom lens.

The zoom lens of each embodiment is an imaging lens system used in an image pickup apparatus. In each sectional view of the zoom lens in which the light path is extended, the left side corresponds to an object side (front side) and the right side corresponds to an image side (rear side).

When the zoom lenses of the respective embodiments are used as projection lenses of, for example, a projector, a screen is provided at the left, and a projection image is provided at the right in the sectional views of the zoom lenses in which the light paths are extended.

In each of the sectional views of the zoom lenses, L1 denotes a first unit (first optical unit) having a positive refractive power (optical refractive power=reciprocal of the focal length), and L2 denotes a second unit (second optical unit) having a negative refractive power. Here, the first unit 1, the second unit 2, and third to fifth units 3 to 5 will be described. One or a plurality of optical elements (lens, aperture, diffractive element, reflective element, etc.) may be included in these units. More specifically, each unit may include one lens or one aperture. Here, the term "unit" may be called an optical unit.

In each embodiment, the second unit L2 includes a negative lens member L2n, including at least one lens, and a prism P. The negative lens member may be composed of one negative lens or a plurality of negative lenses. The negative lens member may include the positive lens if the total refractive power of the negative lens is negative.

In each of the first embodiment and fourth to six embodiments shown in the respective FIGS. 1, 13, 19 and 17, and 21, a third lens unit L3 corresponds to the third unit including an aperture stop SP and having a positive refractive power. More specifically, each third lens unit L3 includes the aperture stop and one positive lens. Each positive lens is a meniscus lens having a convex object side, but does not need to be a meniscus lens. In each of the second embodiment shown in FIG. 5 and the third embodiment shown in FIG. 9, the third unit L3 only includes an aperture stop SP.

Since, in each of the second embodiment shown in FIG. 5 and the third embodiment shown in FIG. 9, the third lens unit L3 only includes the aperture stop SP and does not include a lens.

Here, as mentioned above, a unit not including a lens as is the case in the second and third embodiments will also be called a third unit L3. L4 denotes a fourth unit having a positive refractive power, and L5 denotes a fifth unit having a positive refractive power.

SP denotes the aperture stop. Each prism P is a prism which bends a light path by 90 degrees. The light paths in the first to sixth embodiments shown in the respective FIGS. 1, 5, 9, 13, 17, 21, and 24 are shown in extended states. Reference character G denotes an optical block corresponding to an optical filter, a face plate, etc. IP denotes an image field. When used as a photographing optical system of a video camera or a digital camera, it corresponds to an image pickup plane of a solid-state image pickup element (photoelectric conversion element), such as a CCD sensor or a CMOS sensor. When used as an image pickup optical system of a silver-halide film camera, it corresponds to a film plane.

In each aberration diagram, reference characters d and g denote a d-line and a g-line, respectively, and reference characters ΔM and ΔS denote a meridional image plane and a sagittal image plane, respectively. Chromatic aberration of magnification is represented by the g-line. In the each of the embodiments below, the wide-angle end and the telephoto-end are zooming positions when the first unit L1 and the fourth unit L4 (which are zooming units) are positioned at respective ends in a movable range thereof in a light-axis direction along a mechanism.

Each of the zoom lens according to the second embodiment shown in FIG. 5 and the zoom lens according to the third embodiment shown in FIG. 9 may be handled as a zoom lens including four units as a whole.

When any of the zoom lenses according to the first to sixth embodiments is used in an image pickup apparatus (camera), as shown in FIG. 26, each unit is disposed as a result of bending the light path by the prism P disposed in the second unit L2.

Accordingly, bending the light path by 90 degrees at the prism P disposed in the second unit L2 reduces the thickness of the camera in a front-back direction of the camera.

In each of the embodiments, when zooming is performed from the wide-angle end to the telephoto end, each unit and the aperture stop SP move as indicated by arrows.

The details of the movements are as described below.

In each of the embodiments, when zooming is performed from the wide-angle end to the telephoto end, the first unit L1 moves towards the object side. The second unit L2 is stationary. The third unit L3, fourth unit L4, and fifth unit L5 move towards the object side.

In each of the embodiments, a rear focusing method in which focusing is performed as a result of moving the fifth unit L5 along the light axis is used. A solid curve 5a and a dotted curve 5b regarding the fifth unit L5 are movement loci for correcting a displacement of image field resulting from a change in magnification when focusing an object at infinity and a nearby object. Here, the term "displacement of image field" refers to the displacement of the image field in the light axis direction resulting from a change in magnification. The phase "correcting a displacement of image field" refers to compensating the displacement of the image field (resulting from a change in magnification), that is, reducing the amount of displacement of the image field by moving the fifth unit.

Accordingly, by using the fifth unit L5 in each embodiment to define the convex-shaped loci extending towards the object side, air between the fourth unit L4 and the fifth unit L5 is effectively used, so that the overall lens length from the prism P to the image field IP is effectively reduced. At the telephoto end, focusing from an object at infinity to a nearby object is performed by repeatedly moving forward the fifth unit L5 as indicated by arrow F.

In each embodiment, the movement of an imaging lens, resulting from, for example, camera movement, can be stabilized by moving the fourth unit L4 or a lens/lenses in the fourth unit L4 so as to have a component that is perpendicular to the light axis.

Next, a lens structure according to each of the embodiments will be described.

Unless otherwise specified, components in each lens structure will be described as being disposed from the object side to the image side.

The first unit L1 includes, from the object side, a negative (negative refractive power) 11th lens 11, a positive (positive refractive power) 12th lens 12, and a positive 13th lens 13. The 11th lens 11 is a meniscus lens having a convex surface at the object side. The 13th lens 13 is a meniscus lens having a convex surface at the object side.

In each of the first to fifth embodiments shown in FIGS. 1, 5, 9, 13, and 17, the second unit L2 includes, from the object side, the negative lens member L2n, the prism P, a negative 22nd lens 22, and a positive 23rd lens 23. The negative lens member L2n includes a negative 21st lens 21. The 22nd lens 22 has an absolute refractive power value that is greater at the image field side than at the object side. In each of the first to fifth embodiments, the negative lens member L2n includes one biconcave lens. In the sixth embodiment, the negative lens member L2n includes a negative lens 21a, which is a meniscus lens having a convex surface at the object side. That is, the negative lens member L2n includes one or more negative lenses.

The prism P can be disposed in the second unit L2 behind (image side) of the negative lens member L2n. When the prism P is disposed in a portion of the second unit L2 closest to the object side, a light beam including the most off-axis rays in the second unit L2 is incident upon the prism P.

Since the thickness of the prism P depends upon the height of a light ray incident upon the prism P, the prism P in which the incidence height value of the off-axis ray is large becomes large. Therefore, the camera becomes thicker and larger. Similarly, when the prism P is disposed in a portion of the second unit L2 closest to the image side, the number of lenses closer to the object side than the prism P becomes larger. Therefore, the camera becomes thicker and larger.

Consequently, the structure in which a light beam converged from the first unit L1 having a positive refractive power is scattered by the second unit L2 having a negative refractive power is advantageous for size reduction. When the light beam converged from the first unit L1 having a positive refractive power is scattered by the second unit L2 having a negative refractive power, the light beam passing through the second unit L2 is incident upon the prism P at a large height value, and travels at a gentle angle from the light axis. Therefore, the prism P is small, and the number of lenses closer to the object side than the prism P can be reduced. Consequently, the camera can be easily reduced in size.

When the lens structure at the image side of the prism P includes negative lenses and positive lenses, variations in chromatic aberration, caused by zooming, can be reduced. As a result, optical performance is good. At least one of the negative surfaces positioned closer to the object side than the prism can be an aspherical surface.

This makes it easy to properly correct variations in aberrations resulting from zooming. In the zoom lens, as the distance from the aperture stop SP increases, the off-axis rays pass through a periphery of a lens in the vicinity of the wide-angle end.

To reduce the diameter of a front lens, the negative refractive power of the second unit L2 needs to be increased.

From the aforementioned reasons, the angle at which the off-axis ray is incident upon each lens surface of the second unit L2 is increased, thereby increasing astigmatism.

To overcome this problem, in each embodiment, at least one surface of the negative 21st lens (lens 21a) in the negative lens member L2n in the second unit L2 that is far way from the aperture stop SP is an aspherical surface. This prevents an increase in the diameter of the front lens, and allows aberrations to be properly correct at a large image height near the wide-angle end.

In each of the first embodiment, fifth embodiment, and sixth embodiment shown in FIGS. 1, 17, and 21, respectively, the third unit L3 includes the aperture stop SP and a positive 31st lens 31. The positive 31st lens 31 can be a meniscus lens having a convex form at the object side.

In each of the second embodiment shown in FIG. 5 and the third embodiment shown in FIG. 9, the third unit L3 only includes the aperture stop SP.

In the fourth embodiment shown in FIG. 13, the third unit L3 includes the aperture stop SP and a negative 31st lens 31. The negative 31st lens 31 can be a meniscus lens having a convex form at the object side.

Here, in each of the first embodiment and the fourth embodiment to sixth embodiment in which the aperture stop SP and the lens constitute one unit, at least one surface of the 31st lens 31 is an aspherical surface. When a lens surface near the aperture stop SP is an aspherical surface, variations in aberrations, in particular, spherical aberration and coma aberration, resulting from zooming, are properly corrected.

In each embodiment, the fourth unit L4 includes a positive 41st lens 41 having a convex surface at the object side, a meniscus negative 42nd lens 42 having a convex surface at the object side, and a positive 43rd lens 43 having a biconvex form. When an aspherical surface is provided in the fourth lens unit L4, it can be provided at the positive 41st lens 41 at the object side to the extent possible because aberrations can be effectively corrected.

In particular, at the wide-angle end, spherical aberration can be properly corrected. The form of the aspherical surface when it is provided at a surface closest to the object side can be such that the positive refractive power becomes weaker from the center of the lens to the periphery of the lens.

In each of the embodiments, to reduce the size of the entire lens system, it is important to sufficiently reduce the diameter of a light beam at the fourth unit L4 having a positive refractive power.

In the zoom lens of a zooming type according to each embodiment, divergent light from the second unit L2 tends to be incident upon the fourth unit L4 by nature.

Therefore, to emit an incident light ray after making it thin, the positive refractive power of the fourth unit L4 is made burdensomely large.

To overcome this problem, an object-side surface of the positive 41st lens 41 in the fourth unit L4 is formed into an aspherical surface. In this case, even if the refractive power is increased, the aberrations can be kept low. With the aberrations being maintained in proper states, the light ray is reduced in diameter and emitted. This further reduces the distance between the fourth unit L4 and the fifth unit L5, so that the size of the entire lens system is reduced.

In each embodiment, divergent light is incident upon the object-side aspherical lens surface of the positive 41st lens 41, and is converged at the lens surface. In addition, the image-side lens surface of the 41st lens 41 is such that convergent light is incident thereupon, so that aberrations are properly corrected.

In each embodiment, the fifth unit L5 includes a positive 51st lens 51 and a negative 52nd lens 52. Here, the positive 51st lens 51 can be a biconvex lens and the negative 52nd lens 52 can be a meniscus lens having a convex surface at the image side.

By this, variations in chromatic aberration occurring when focusing is performed are reduced at the fifth unit L5.

When each unit is formed as described above, during zooming from the wide-angle end to the telephoto end, each unit is moved so that the distance between the first unit and the second unit is increased, the distance between the second unit and the third unit is reduced, and the distance between the third unit and the fourth unit is reduced. Here, the second unit, including a prism that bends the light path by substantially 90 degrees (that is, an angle greater than or equal to 80 degrees and less than or equal to 100 degrees), can be made stationary, and that the first unit, the third unit, and the fourth unit can be moved, to correct displacement of image field (resulting from zooming) at the fifth unit.

In each embodiment, at least one of the following conditions is satisfied. By this, an advantage in correspondence with each condition is provided.

The focal lengths of the entire system at the wide-angle end and the telephoto end are fw and fT, respectively. The focal length of the first unit L1 and the focal length of the second unit L2 are f1 and f2, respectively. The focal length of the negative lens member L2n is fN. The distance on the light axis from the lens surface of the second unit L2 closest to the object side to the aperture stop SP at the wide-angle end is L. Here, the length of the prism P in the light-axis direction is an "air conversion length," which is the length of the prism P in the light-axis direction converted into the length of the prism P in air. More specifically, it is the length of the prism P in the light-axis direction divided by the refractive index of the prism.

The average value of the refractive index of a material making up the negative lens member (L2n) is n21.

The thickness of the prism P on the light axis is D.

The absolute values of the amounts of movements of the first unit L1, the third unit L3, and the fourth unit L4, required for zooming from the wide-angle end to the telephoto end, are M1, M3, and M4, respectively. The amount of movement means, in each unit, the difference between a position in the wide-angle end and a position in the telephoto end (that is, the distance from the position in the wide-angle end to the position in the telephoto end).

The curvature radius and a center wall thickness of the object-side surface of the 41st lens is R41 and D41, respectively.

The curvature radius of the object-side surface of the 42nd lens and that of the image-side surface of the 42nd lens are R42a and R42b, respectively.

A lateral magnification when the fifth unit L5 is moved and is focused on an object at infinity at the telephoto end is β5T.

Here, at least one of the following Numerical Conditions (1) to (11) is satisfied:

$$0.20 < |f2|\sqrt{(fW \cdot fT)} < 0.45 \quad (1)$$

$$0.80 < |fN/fW| < 1.90 \quad (2)$$

$$2.70 < L/fW < 4.20 \quad (3)$$

$$1.80 < n21 < 1.95 \quad (4)$$

$$1.10 < |D/f2| < 2.00 \quad (5)$$

$$0.90 < M1/M4 < 1.70 \quad (6)$$

$$0.20 < M3/M4 < 1.20 \quad (7)$$

$$0.15 < D41/R41 < 0.40 \quad (8)$$

$$1.50 < R42a/R42b < 4.50 \quad (9)$$

$$0.55 < \beta 5T < 0.85 \quad (10)$$

$$0.35 < f1/fT < 0.85 \quad (11)$$

Next, the technical meaning of each of the aforementioned conditions will be described.

Condition (1) is for obtaining a small zoom lens having a high zoom ratio.

When the upper limit of Condition (1) is exceeded, the focal length of the second unit L2 becomes long. This is advantageous for properly maintaining optical performance.

However, in this case, to obtain a predetermined zoom ratio, the first unit L1 and the fourth unit L4 are moved by a large amount, thereby increasing the overall lens length and the diameter of the front lenses. This is not desirable.

When $|f2| \sqrt{(fW \cdot fT)}$ goes past the lower limit of Condition (1), the focal length of the second unit L2 becomes short. This is advantageous for reducing the size of the entire lens system. However, the Petzval sum is increased in a negative direction, causing a field curvature to be enlarged. Therefore, it is difficult to maintain good optical performance.

Condition (2) is for obtaining a small zoom lens having good optical performance.

When the upper limit of Condition (2) is exceeded, the focal length fN of the negative lens member L2n of the second unit L2 is increased. This is advantageous for facilitating correction of astigmatism at a position where an image height value is large near the wide-angle end.

However, in correspondence with the amount by which the refractive power of the negative lens member L2n is reduced, the position that is situated from the light axis where an off-axis ray passes and that determines the effective diameter of the first unit L1 becomes high. Therefore, the diameter of the front lens is increased, thereby increasing the thickness of the camera. Consequently, it is difficult to reduce the size of the camera.

When |fN/fW| passes the lower limit of Condition (2), the focal length of the negative lens member L2n of the second unit L2 is shortened. This is advantageous for size reduction. However, astigmatism is increased, thereby reducing optical performance, which is not desirable.

Condition (3) is for reducing the size of the zoom lens. In particular, it is a condition to restrict spreading of an off-axis ray, determining the diameter of the front lens, at the wide-angle end. When the upper limit of Condition (3) is exceeded, the distance from the object-side lens surface of the second unit L2 to the aperture stop SP is increased. Therefore, the diameter of the front lens is increased, thereby making it difficult to reduce the size of the zoom lens.

Here, within the distance from the object-side lens surface of the second unit L2 to the aperture stop SP, the distance of the prism P on the light axis is converted to a distance in air. When the distance of the prism P on the light axis is 8.8 mm, and the refractive index of a material of the prism P is 2.0, the air conversion length is 8.8÷2.0=4.4 mm.

To reduce the diameter of the front lens while the aperture stop SP is far away from the second unit L2, the refractive index of the material of the negative lens member L2n of the second unit L2 needs to be increased. However, if the refractive power of the negative lens member L2n is increased, good optical performance can no longer be provided, which is not desirable.

When L/fW passes the lower limit of Condition (3), the distance from the object-side lens surface of the second unit L2 to the aperture stop SP is reduced, thereby reducing the effective diameter of the front lens. Therefore, this is advantageous for reducing size of the zoom lens.

However, the distance between the aperture stop SP and the fourth unit L4 is increased. When the distance between the aperture stop SP and the fourth unit L4 is increased, the height of an axial ray incident upon the fourth unit L4 is increased, thereby increasing the effective diameter of the fourth unit L4.

When the height of the axial ray incident upon the fourth unit L4 from the light axis is increased, spherical aberration and coma aberration are increased. In addition, since the effective diameter of the fourth unit L4 is increased, the lens thickness is increased to satisfy a lens manufacturing condition. This is disadvantageous for reducing the size of the zoom lens, and is not desirable.

Condition (4) is related to the refractive index of the material of the negative lens member L2n of the second unit L2. When the upper limit of Condition (4) is exceeded, the refractive index of the material of the negative lens member L2n is increased. This is advantageous for correcting curvature of field. However, usable materials, are, actually, limited, which is not desirable. When n21 passes the lower limit of Condition (4), the refractive index of the material of the negative lens member L2n is reduced, thereby increasing the Petzval sum in a negative direction. This exaggerates the image field.

Further, in correspondence with a reduction in the refractive index, the curvature of a lens surface is reduced, thereby requiring extra air space. This is not desirable for reducing the size of the zoom lens.

Condition (5) is related to the thickness of the prism P, used for bending the light path by 90 degrees, on the light axis.

When the upper limit of Condition (5) is exceeded, the thickness of the prism P on the light axis is increased, thereby increasing the thickness of the camera. This is disadvantageous for reducing the size of the zoom lens, and is, thus, not desirable. When |D/f2| passes the lower limit of Condition (5), the thickness of the prism P on the light axis is reduced. Therefore, to cause a light ray to pass through the prism, the refractive power of the negative lens member L2n of the second unit L2 needs to be increased.

As a result, when the refractive power of the negative lens member L2n is increased, astigmatism is increased, thereby preventing good optical performance from being realized.

Condition (6) is related to the amounts of movements of the first unit L1 and the fourth unit L4 during zooming. When the upper limit of Condition (6) is exceeded, the amount of movement of the first unit L1 is increased, thereby increasing the overall lens length at the telephoto end.

When M1/M4 passes the lower limit of Condition (6), the amount of movement of the first unit L1 is reduced, thereby increasing the refractive power of the first unit L1. Therefore, chromatic aberration of magnification is increased, thereby preventing good optical performance from being realized.

Condition (7) is related to the amounts of movements of the third unit L3 and the fourth unit L4. When the upper limit of Condition (7) is exceeded, the amount of movement of the third unit L3 is increased, thereby increasing the diameter of the front lens. This is disadvantageous for size reduction, and is, thus, not desirable. In contrast, when M3/M4 passes the lower limit of Condition (7), the amount of movement of the third unit L3 is reduced, thereby reducing the effective diameter of the front lens. Therefore, this is advantageous for size reduction. However, the distance between the aperture stop SP and the fourth unit L4 is increased, thereby increasing spherical aberration and coma aberration. This makes it difficult to provide good optical performance.

Condition (8) is related to the center wall thickness of the 41st lens.

When the upper limit of Condition (8) is exceeded, the center wall thickness of the 41st lens 41 is increased, thereby increasing the volume of the 41st lens 41. Therefore, the weight of the 41st lens 41 is increased, which is not desirable.

When molding is performed, a molding duct is increased in length. This is disadvantageous for manufacturing the zoom lens and reducing the size of the fourth unit L4.

When D41/R41 passes the lower limit of Condition (8), the center wall thickness of the 41st lens 41 is reduced, thereby reducing the height of an off-axis ray from the light axis when it is refracted at the image-side lens surface. Therefore, off-axis coma aberration is not sufficiently corrected.

In particular, when the image-side lens surface of the 41st lens 41 is an aspherical surface, the effect of correcting the off-axis coma aberration is reduced at an area of the periphery of the lens where a change in curvature is relatively large due to the aspherical form. This is not desirable.

Condition (9) is related to the lens form of the 42nd lens 42.

When the upper limit of Condition (9) is exceeded, the lens form is changed. This causes a rear-side principal point of the fourth unit L4 to be too close to the object side, thereby reducing the distance between the fourth unit L4 and the fifth unit L5. As a result, it becomes difficult to provide sufficient space of movement of the fourth unit L4 that moves for zooming and focusing operations.

When R42a/R42b passes the lower limit of Condition (9), the lens form is changed. This moves the rear-side principal point of the fourth unit L4 towards the object, thereby reducing the effect of size reduction, and increasing the overall lens length.

Condition (10) is for reducing the size of the entire optical system as a result of reducing variations in aberrations resulting from focusing. When the upper limit of Condition (10) is exceeded, the lateral magnification of the fifth unit L5 is increased, thereby reducing the sensitivity of the fifth unit L5 to focusing.

Therefore, the amount of forward movement of the fifth unit L5 when focusing a nearby object is increased. This prevents the distance between the fourth unit L4 and the fifth unit L5 from being reduced, thereby making it difficult to achieve size reduction.

When the amount of movement of the fifth unit L5 is increased when focusing, variations in aberrations resulting from focusing are increased. This is not desirable. In contrast, when β5T passes the lower limit of Condition (10), the lateral magnification is reduced, thereby increasing back focus and increasing the overall lens length. This is not desirable.

Condition (11) is related to the focal length of the first unit L1.

When the upper limit of Condition (11) is exceeded, the focal length of the first unit L1 is increased, thereby increasing the focal length of the entire lens system. This makes it difficult to provide a predetermined focal length range (zooming range) and is, thus, not desirable. In contrast, when f1/fT passes the lower limit of Condition (11), the focal length of the first unit L1 is reduced, thereby burdensomely increasing the refractive power of the first unit L1. In particular, spherical aberration and chromatic aberration of magnification are increased at the telephoto end. Therefore, this case is not desirable.

In each of the embodiments, numerical ranges of the aforementioned respective conditions can be set as follows:

$$0.24 < |f2|/\sqrt{(fW \cdot fT)} < 0.42 \tag{1a}$$

$$1.05 < |fN/fW| < 1.65 \tag{2a}$$

$$2.90 < L/fW < 4.10 \tag{3a}$$

$$1.83 < n21 < 1.90 \tag{4a}$$

$$1.20 < |D/f2| < 1.90 \tag{5a}$$

$$1.10 < M1/M4 < 1.50 \tag{6a}$$

$$0.35 < M3/M4 < 0.90 \tag{7a}$$

$$0.20 < D41/R41 < 0.32 \tag{8a}$$

$$1.90 < R42a/R42b < 4.00 \tag{9a}$$

$$0.60 < \beta 5T < 0.75 \tag{10a}$$

$$0.44 < f1/fT < 0.72 \tag{11a}$$

The zoom lens according to the invention of the application does not need to satisfy all of the Conditions (1) to (11) and (1a) to (11a). At least one of the conditions only needs to be satisfied. In particular, at least one (or, if possible, all) of the Conditions (1) to (3) is satisfied.

In each of the embodiments, a unit having a small refractive power may be added to the object side of the first unit L1 or the image side of the fifth unit L5. For example, a teleconverter lens or a wide converter lens may be disposed at the object side or the image side.

Accordingly, according to each embodiment, a zoom lens that includes a lens system whose overall size is small and that provides high optical performance regardless of a high zooming ratio is provided.

In addition, a zoom lens using a rear-focus system and providing good optical performance at a high zooming ratio of from 9× to 12× and within an overall zooming area from the wide-angle end to the telephoto end is provided.

The second unit L2 is made stationary for zooming, and the light path is bent, so that the camera can be reduced in size. Regardless of the high zooming ratio of from 9× to 12×, a zoom lens providing a high optical performance over the entire zooming range is provided.

Next, numerical examples of the embodiments will be given. In each numerical example, i represents the order of a surface from the object side, Ri represents the curvature radius of an ith (i) surface, Di represents the distance between the i surface and an i+1 surface, and Ni and νi represent the refractive index and the Abbe number with reference to a d-line, respectively. In addition, in each numerical example, the two surfaces that are closest to the image side are plane surfaces corresponding to the optical block G. k, B, C, D, E, and F represent aspherical coefficients. When a displacement in the light-axis direction at a position having a height h from the light axis is x with reference to a surface vertex, the aspherical shape is defined as follows:

$$x = (h^2/R)/[1 + \{1-(1+k)(h/R)^2\}^{1/2}] + Bh^4 + Ch^6 + Dh^8 + Eh^{10} + Fh^{12}$$

where R represents a paraxial radius of curvature. Further, for example, "e−Z" means "$10^{-z}$." f represents a focal length, Fno represents an F number, and ω represents a half angle of view. The relationship between each of the above-described conditions and each of the numerical examples is as indicated in Table 1.

Numerical Example 1

| f = 5.96-56.31 Fno = 2.88-4.33 ω = 30.9°-3.6° | | | |
|---|---|---|---|
| R1 = 29.084 | D1 = 1.30 | N1 = 1.805181 | ν1 = 25.4 |
| R2 = 19.623 | D2 = 4.40 | N2 = 1.496999 | ν2 = 81.5 |
| R3 = 692.725 | D3 = 0.15 | | |
| R4 = 22.287 | D4 = 2.65 | N3 = 1.603112 | ν3 = 60.6 |
| R5 = 83.412 | D5 = variable | | |
| R6 = −44.328 | D6 = 0.65 | N4 = 1.882997 | ν4 = 40.8 |
| R7 = 7.975 | D7 = 2.40 | | |
| R8 = ∞ | D8 = 8.80 | N5 = 2.003300 | ν5 = 28.3 |
| R9 = ∞ | D9 = 0.10 | | |
| R10 = 108.169 | D10 = 0.55 | N5 = 1.772499 | ν5 = 49.6 |
| R11 = 9.326 | D11 = 0.47 | | |
| R12 = 9.564 | D12 = 1.55 | N6 = 1.922860 | ν6 = 18.9 |
| R13 = 20.893 | D13 = variable | | |
| R14 = aperture | D14 = 1.00 | | |
| R15 = 23.802 | D15 = 1.00 | N7 = 1.772499 | ν7 = 49.6 |
| R16 = 44.427 | D16 = variable | | |
| R17 = 7.635 | D17 = 2.15 | N8 = 1.693501 | ν8 = 53.2 |
| R18 = 59.450 | D18 = 1.53 | | |
| R19 = 17.036 | D19 = 0.55 | N9 = 1.846660 | ν9 = 23.9 |
| R20 = 6.502 | D20 = 0.75 | | |
| R21 = 25.637 | D21 = 1.20 | N10 = 1.603112 | ν10 = 60.6 |
| R22 = −34.014 | D22 = variable | | |
| R23 = 18.301 | D23 = 2.70 | N11 = 1.603112 | ν11 = 60.6 |
| R24 = −16.384 | D24 = 0.30 | | |
| R25 = −17.932 | D25 = 0.55 | N12 = 1.922860 | ν12 = 18.9 |
| R26 = −32.789 | D26 = variable | | |
| R27 = ∞ | D27 = 2.00 | N13 = 1.516330 | ν13 = 64.1 |
| R28 = ∞ | | | |

| | Variable interval | | |
|---|---|---|---|
| Focal length | 5.96 | 15.03 | 56.31 |
| D5 | 1.09 | 8.50 | 17.76 |
| D13 | 10.90 | 4.12 | 1.60 |
| D16 | 3.96 | 1.52 | 0.65 |
| D22 | 7.76 | 13.33 | 22.82 |
| D26 | 6.49 | 10.13 | 4.03 |

| Aspherical Surface Coefficient | | | | |
|---|---|---|---|---|
| R6 | k = 1.51736e+01 | B = 1.85461e−04 | C = −9.02884e−07 | D = −3.10691e−08 |
| | E = 1.19550e−09 | F = −1.22545e−11 | | |
| R15 | k = 4.53019e+00 | B = −3.09819e−05 | C = 3.23536e−09 | D = −1.36000e−07 |
| | E = 2.22415e−09 | | | |
| R17 | k = −4.40287e−01 | B = −4.81219e−05 | C = −2.43245e−06 | D = 3.65244e−07 |
| | E = −1.28667e−08 | | | |

Numerical Example 2

| f = 5.82-65.24 Fno = 2.70-4.33 ω = 31.5°-3.13° | | | |
|---|---|---|---|
| R1 = 30.692 | D1 = 1.30 | N1 = 1.805181 | ν1 = 25.4 |
| R2 = 20.116 | D2 = 4.50 | N2 = 1.496999 | ν2 = 81.5 |
| R3 = −551.357 | D3 = 0.15 | | |
| R4 = 20.561 | D4 = 2.80 | N3 = 1.603112 | ν3 = 60.6 |
| R5 = 69.415 | D5 = variable | | |
| R6 = −31.487 | D6 = 0.65 | N4 = 1.882997 | ν4 = 40.8 |
| R7 = 6.992 | D7 = 2.20 | | |
| R8 = ∞ | D8 = 8.80 | N5 = 2.003300 | ν5 = 28.3 |
| R9 = ∞ | D9 = 0.15 | | |
| R10 = −537.450 | D10 = 0.55 | N5 = 1.696797 | ν5 = 55.5 |
| R11 = 13.348 | D11 = 0.40 | | |
| R12 = 12.639 | D12 = 1.35 | N6 = 1.922860 | ν6 = 18.9 |
| R13 = 39.135 | D13 = variable | | |
| R14 = aperture | D14 = variable | | |
| R15 = 10.503 | D15 = 2.30 | N7 = 1.677900 | ν7 = 55.3 |

-continued

| | | | |
|---|---|---|---|
| R16 = −82.375 | D16 = 4.06 | | |
| R17 = 16.478 | D17 = 0.60 | N8 = 1.922860 | ν8 = 18.9 |
| R18 = 8.180 | D18 = 0.68 | | |
| R19 = 27.076 | D19 = 1.20 | N9 = 1.603112 | ν9 = 60.6 |
| R20 = −49.819 | D20 = variable | | |
| R21 = 19.486 | D21 = 2.75 | N10 = 1.603112 | ν10 = 60.6 |
| R22 = −15.448 | D22 = 0.30 | | |
| R23 = −14.731 | D23 = 0.55 | N11 = 1.922860 | ν11 = 18.9 |
| R24 = −20.601 | D24 = variable | | |
| R25 = ∞ | D25 = 2.00 | N12 = 1.516330 | ν12 = 64.1 |
| R26 = ∞ | | | |

| | Variable Interval | | |
|---|---|---|---|
| Focal Length | 5.82 | 11.00 | 65.24 |
| D5 | 1.26 | 4.95 | 17.69 |
| D13 | 9.93 | 4.45 | 1.58 |
| D14 | 5.14 | 2.26 | 0.54 |
| D20 | 5.90 | 10.79 | 23.04 |
| D24 | 7.39 | 10.87 | 3.21 |

Aspherical Surface Coefficient

| | | | | |
|---|---|---|---|---|
| R6 | k = 8.21639e+00 | B = 3.33593e−04 | C = −3.51908e−06 | D = 2.69097e−08 |
| | E = 2.47456e−10 | F = −5.92604e−12 | | |
| R15 | k = −6.48043e−01 | B = −4.60172e−05 | C = −5.73108e−06 | D = 6.34476e−07 |
| | E = −2.26301e−08 | | | |

Numerical Example 3

| f = 5.50-52.42 Fno = 2.88-4.33 ω = 33.0°-3.9° | | | |
|---|---|---|---|
| R1 = 30.191 | D1 = 1.30 | N1 = 1.805181 | ν1 = 25.4 |
| R2 = 20.205 | D2 = 4.10 | N2 = 1.496999 | ν2 = 81.5 |
| R3 = 259.345 | D3 = 0.15 | | |
| R4 = 21.276 | D4 = 2.75 | N3 = 1.603112 | ν3 = 60.6 |
| R5 = 78.535 | D5 = variable | | |
| R6 = −38.339 | D6 = 0.65 | N4 = 1.882997 | ν4 = 40.8 |
| R7 = 6.774 | D7 = 2.60 | | |
| R8 = ∞ | D8 = 8.80 | N5 = 2.003300 | ν5 = 28.3 |
| R9 = ∞ | D9 = 0.09 | | |
| R10 = −313577.572 | D10 = 0.55 | N5 = 1.696797 | ν5 = 55.5 |
| R11 = 17.444 | D11 = 0.39 | | |
| R12 = 15.058 | D12 = 1.25 | N6 = 1.922860 | ν6 = 18.9 |
| R13 = 49.910 | D13 = variable | | |
| R14 = aperture | D14 = variable | | |
| R15 = 10.461 | D15 = 2.50 | N7 = 1.693501 | ν7 = 53.2 |
| R16 = −49.586 | D16 = 3.12 | | |
| R17 = 16.304 | D17 = 0.55 | N8 = 1.922860 | ν8 = 18.9 |
| R18 = 8.102 | D18 = 1.15 | | |
| R19 = 44.623 | D19 = 1.20 | N9 = 1.603112 | ν9 = 60.6 |
| R20 = −43.220 | D20 = variable | | |
| R21 = 14.688 | D21 = 3.25 | N10 = 1.603112 | ν10 = 60.6 |
| R22 = −17.248 | D22 = 0.30 | | |
| R23 = −16.503 | D23 = 0.55 | N11 = 1.922860 | ν11 = 18.9 |
| R24 = −28.734 | D24 = variable | | |
| R25 = ∞ | D25 = 2.00 | N12 = 1.516330 | ν12 = 64.1 |
| R26 = ∞ | | | |

| | Variable Interval | | |
|---|---|---|---|
| Focal Length | 5.50 | 10.04 | 52.42 |
| D5 | 1.37 | 4.41 | 18.20 |
| D13 | 7.41 | 1.08 | 1.31 |
| D14 | 9.08 | 7.00 | 0.52 |
| D20 | 6.29 | 12.82 | 23.40 |
| D24 | 5.50 | 7.37 | 3.05 |

-continued

| f = 5.50-52.42 Fno = 2.88-4.33 ω = 33.0°-3.9° | | | |
|---|---|---|---|
| Aspherical Surface Coefficient | | | |
| R6 | k = 1.37463e+01  B = 3.16820e−04 | C = −3.27593e−06 | D = 1.36507e−08 |
|    | E = 9.33347e−10  F = −1.60821e−11 | | |
| R15 | k = 1.24610e+00  B = −2.86430e−04 | C = −1.26083e−06 | D = −1.15832e−07 |
|    | E = 1.34362e−09 | | |

Numerical Example 4

| f = 5.77-65.23 Fno = 2.88-4.33 ω = 31.8°-3.1° | | | |
|---|---|---|---|
| R1 = 29.868 | D1 = 1.30 | N1 = 1.805181 | ν1 = 25.4 |
| R2 = 19.946 | D2 = 4.40 | N2 = 1.496999 | ν2 = 81.5 |
| R3 = 999.269 | D3 = 0.15 | | |
| R4 = 22.877 | D4 = 2.60 | N3 = 1.603112 | ν3 = 60.6 |
| R5 = 87.587 | D5 = variable | | |
| R6 = −50.727 | D6 = 0.65 | N4 = 1.882997 | ν4 = 40.8 |
| R7 = 7.405 | D7 = 2.40 | | |
| R8 = ∞ | D8 = 8.80 | N5 = 2.003300 | ν5 = 28.3 |
| R9 = ∞ | D9 = 0.09 | | |
| R10 = 90.986 | D10 = 0.55 | N5 = 1.772499 | ν5 = 49.6 |
| R11 = 10.129 | D11 = 0.28 | | |
| R12 = 10.007 | D12 = 1.45 | N6 = 1.922860 | ν6 = 18.9 |
| R13 = 22.813 | D13 = variable | | |
| R14 = aperture | D14 = 0.80 | | |
| R15 = 27.715 | D15 = 1.00 | N7 = 1.772499 | ν7 = 49.6 |
| R16 = 26.481 | D16 = variable | | |
| R17 = 8.261 | D17 = 2.50 | N8 = 1.693501 | ν8 = 53.2 |
| R18 = −69.979 | D18 = 2.92 | | |
| R19 = 28.911 | D19 = 0.55 | N9 = 1.846660 | ν9 = 23.9 |
| R20 = 7.357 | D20 = 0.79 | | |
| R21 = 29.398 | D21 = 1.20 | N10 = 1.603112 | ν10 = 60.6 |
| R22 = −28.992 | D22 = variable | | |
| R23 = 18.549 | D23 = 2.70 | N11 = 1.603112 | ν11 = 60.6 |
| R24 = −16.317 | D24 = 0.30 | | |
| R25 = −19.493 | D25 = 0.55 | N12 = 1.922860 | ν12 = 18.9 |
| R26 = −33.893 | D26 = variable | | |
| R27 = ∞ | D27 = 2.00 | N13 = 1.516330 | ν13 = 64.1 |
| R28 = ∞ | | | |

| | Variable Interval | | |
|---|---|---|---|
| Focal Length | 5.77 | 12.16 | 65.23 |
| D5 | 1.02 | 5.54 | 19.19 |
| D13 | 11.76 | 4.39 | 1.30 |
| D16 | 3.15 | 2.21 | 1.29 |
| D22 | 6.48 | 10.68 | 21.79 |
| D26 | 6.59 | 10.70 | 3.59 |

| Aspherical Surface Coefficient | | | |
|---|---|---|---|
| R6 | k = −1.74717e+00  B = 1.57117e−04 | C = −1.12064e−06 | D = −2.40064e−08 |
|    | E = 1.03911e−09  F = −1.10285e−11 | | |
| R15 | k = −7.98741e+01  B = 5.96282e−04 | C = −2.05798e−05 | D = −4.47065e−08 |
|    | E = 3.42370e−08 | | |
| R17 | k = −3.86722e−01  B = −2.50568e−04 | C = 1.24985e−06 | D = 3.84261e−07 |
|    | E = −2.34063e−08 | | |

Numerical Example 5

| f = 5.96-56.32 Fno = 2.88-4.33 ω = 30.9°-3.6° ||||
|---|---|---|---|
| R1 = 29.923 | D1 = 1.30 | N1 = 1.805181 | ν1 = 25.4 |
| R2 = 19.817 | D2 = 4.40 | N2 = 1.496999 | ν2 = 81.5 |
| R3 = 1065.081 | D3 = 0.15 | | |
| R4 = 20.331 | D4 = 2.85 | N3 = 1.603112 | ν3 = 60.6 |
| R5 = 67.625 | D5 = variable | | |
| R6 = −368.273 | D6 = 0.65 | N4 = 1.882997 | ν4 = 40.8 |
| R7 = 7.052 | D7 = 2.40 | | |
| R8 = ∞ | D8 = 0.00 | N5 = 2.003300 | ν5 = 28.3 |
| R9 = ∞ | D9 = 0.42 | | |
| R10 = −69.265 | D10 = 0.55 | N5 = 1.772499 | ν5 = 49.6 |
| R11 = 8.843 | D11 = 0.43 | | |
| R12 = 8.966 | D12 = 1.55 | N6 = 1.922860 | ν6 = 18.9 |
| R13 = 19.759 | D13 = variable | | |
| R14 = aperture | D14 = 1.00 | | |
| R15 = 24.586 | D15 = 1.00 | N7 = 1.772499 | ν7 = 49.6 |
| R16 = 83.005 | D16 = variable | | |
| R17 = 8.152 | D17 = 2.30 | N8 = 1.693501 | ν8 = 53.2 |
| R18 = 670.005 | D18 = 1.15 | | |
| R19 = 18.907 | D19 = 0.55 | N9 = 1.846660 | ν9 = 23.9 |
| R20 = 6.839 | D20 = 0.79 | | |
| R21 = 36.274 | D21 = 1.20 | N10 = 1.603112 | ν10 = 60.6 |
| R22 = −24.956 | D22 = variable | | |
| R23 = 18.913 | D23 = 2.60 | N11 = 1.603112 | ν11 = 60.6 |
| R24 = −17.528 | D24 = 0.30 | | |
| R25 = −21.825 | D25 = 0.55 | N12 = 1.922860 | ν12 = 18.9 |
| R26 = −58.211 | D26 = variable | | |
| R27 = ∞ | D27 = 2.00 | N13 = 1.516330 | ν13 = 64.1 |
| R28 = ∞ | | | |

| | Variable Interval |||
|---|---|---|---|
| Focal Length | 5.96 | 15.23 | 56.32 |
| D5 | 0.78 | 7.90 | 17.20 |
| D13 | 9.31 | 2.68 | 1.60 |
| D16 | 4.73 | 2.30 | 0.51 |
| D22 | 10.14 | 12.83 | 23.05 |
| D26 | 5.00 | 11.37 | 4.02 |

| Aspherical Surface Coefficient |||||
|---|---|---|---|---|
| R6 | k = 2.28344e+03 | B = 9.43762e−05 | C = −2.60075e−08 | D = −3.39267e−08 |
| | E = 8.87312e−10 | | | |
| | F = −7.46469e−12 | | | |
| R15 | k = 1.62906e+01 | B = −1.53373e−04 | C = −8.16138e−07 | D = −9.46956e−08 |
| | E = −9.83389e−09 | | | |
| R17 | k = −6.17182e−01 | B = −1.87458e−05 | C = −1.61897e−06 | D = 1.77639e−07 |
| | E = −3.71156e−09 | | | |

Numerical Example 6

| f = 5.96-56.29 Fno = 2.88-4.33 ω = 30.9°-3.6° ||||
|---|---|---|---|
| R1 = 38.647 | D1 = 1.30 | N1 = 1.805181 | ν1 = 25.4 |
| R2 = 24.776 | D2 = 0.30 | | |
| R3 = 24.729 | D3 = 3.85 | N2 = 1.496999 | ν2 = 81.5 |
| R4 = −1819.468 | D4 = 0.18 | | |
| R5 = 25.226 | D5 = 2.60 | N3 = 1.603112 | ν3 = 60.6 |
| R6 = 85.013 | D6 = variable | | |
| R7 = 187.241 | D7 = 0.65 | N4 = 1.882997 | ν4 = 40.8 |
| R8 = 23.495 | D8 = 0.73 | | |
| R 9 = 54.316 | D9 = 0.50 | N5 = 1.804000 | ν5 = 46.6 |
| R10 = 9.542 | D10 = 2.00 | | |
| R11 = ∞ | D11 = 8.80 | N6 = 1.772499 | ν6 = 49.6 |
| R12 = ∞ | D12 = 0.09 | | |
| R13 = −1809.110 | D13 = 0.55 | N6 = 1.772499 | ν6 = 49.6 |
| R14 = 8.867 | D14 = 0.48 | | |

-continued

| | | | |
|---|---|---|---|
| R15 = 9.230 | D15 = 1.25 | N7 = 1.922860 | ν7 = 18.9 |
| R16 = 17.967 | D16 = variable | | |
| R17 = aperture | D17 = 1.00 | | |
| R18 = 12.643 | D18 = 1.00 | N8 = 1.804000 | ν8 = 46.6 |
| R19 = 21.424 | D19 = variable | | |
| R20 = 6.540 | D20 = 2.00 | N9 = 1.693501 | ν9 = 53.2 |
| R21 = 15.018 | D21 = 0.30 | | |
| R22 = 13.969 | D22 = 0.80 | N10 = 1.846660 | ν10 = 23.9 |
| R23 = 6.103 | D23 = 1.40 | | |
| R24 = 25.356 | D24 = 1.70 | N11 = 1.603112 | ν11 = 60.6 |
| R25 = −19.863 | D25 = variable | | |
| R26 = 17.751 | D26 = 2.20 | N12 = 1.592400 | ν12 = 68.3 |
| R27 = −20.963 | D27 = 0.30 | | |
| R28 = −24.643 | D28 = 0.55 | N13 = 1.922860 | ν13 = 18.9 |
| R29 = −94.323 | D29 = variable | | |
| R30 = ∞ | D30 = 2.00 | N14 = 1.516330 | ν14 = 64.1 |
| R31 = ∞ | | | |

| | Variable Interval | | |
|---|---|---|---|
| Focal Length | 5.96 | 14.41 | 56.29 |
| D6 | 0.89 | 8.94 | 21.33 |
| D16 | 11.21 | 4.43 | 1.59 |
| D19 | 5.31 | 2.98 | 0.50 |
| D25 | 7.28 | 13.42 | 23.77 |
| D29 | 6.48 | 9.45 | 4.43 |

Aspherical Surface Coefficient

| | | | | |
|---|---|---|---|---|
| R7 | k = −5.54514e+03 | B = 1.80276e−04 | C = −3.57488e−06 | D = −2.89965e−08 |
| | E = 8.70855e−10 | F = −2.23230e−12 | | |
| R8 | k = 4.44124e+00 | B = 7.32601e−06 | C = 9.77828e−07 | D = −2.28142e−07 |
| | E = 3.12445e−09 | | | |
| R18 | k = −1.10241e+00 | B = 1.90002e−05 | C = 1.54841e−06 | D = −1.64938e−07 |
| R20 | k = 4.92528e−01 | B = −2.78882e−04 | C = −8.40554e−06 | D = −5.04028e−07 |
| | E = 2.05188e−08 | | | |
| R21 | k = 2.31497e+00 | B = 1.01149e−04 | C = −4.11221e−06 | D = −4.65700e−07 |
| | E = 5.77391e−08 | | | |

TABLE 1

| | | LOWER LIMIT | UPPER LIMIT | FIRST EMBODIMENT | SECOND EMBODIMENT | THIRD EMBODIMENT | FOURTH EMBODIMENT | FIFTH EMBODIMENT | SIXTH EMBODIMENT |
|---|---|---|---|---|---|---|---|---|---|
| (1) | $|f2|/\sqrt{(fW \cdot fT)}$ | 0.20 | 0.45 | 0.315 | 0.316 | 0.405 | 0.307 | 0.264 | 0.320 |
| (2) | $|fN/fw|$ | 0.80 | 1.90 | 1.277 | 1.104 | 1.178 | 1.262 | 1.313 | 1.609 |
| (3) | L/fw | 2.70 | 4.20 | 3.525 | 3.371 | 3.152 | 3.739 | 3.306 | 3.759 |
| (4) | N21 | 1.80 | 1.95 | 1.883 | 1.883 | 1.883 | 1.883 | 1.883 | 1.843 |
| (5) | D/f2 | 1.10 | 2.00 | 1.524 | 1.412 | 1.281 | 1.479 | 1.818 | 1.499 |
| (6) | M1/M4 | 0.90 | 1.70 | 1.322 | 1.269 | 1.149 | 1.475 | 1.376 | 1.416 |
| (7) | M3/M4 | 0.20 | 1.20 | 0.738 | 0.645 | 0.416 | 0.849 | 0.646 | 0.667 |
| (8) | D41/R41 | 0.15 | 0.40 | 0.282 | 0.219 | 0.239 | 0.303 | 0.282 | 0.306 |
| (9) | R42a/R42b | 1.50 | 4.50 | 2.620 | 2.015 | 2.012 | 3.930 | 2.765 | 2.289 |
| (10) | β5T | 0.55 | 0.85 | 0.649 | 0.666 | 0.637 | 0.655 | 0.689 | 0.714 |
| (11) | f1/fT | 0.35 | 0.85 | 0.578 | 0.465 | 0.637 | 0.509 | 0.565 | 0.696 |
| | fW | — | — | 5.959 | 5.822 | 5.498 | 5.767 | 5.959 | 5.963 |
| | fT | — | — | 56.311 | 66.888 | 52.418 | 65.230 | 56.316 | 56.288 |
| | f1 | — | — | 32.527 | 31.072 | 33.385 | 33.188 | 31.810 | 39.162 |
| | f2 | — | — | −5.776 | −6.231 | −6.872 | −5.948 | −4.840 | −5.872 |
| | L | — | — | 21.005 | 19.623 | 17.331 | 21.561 | 19.700 | 22.416 |
| | fN | — | — | −7.610 | −6.428 | −6.476 | −7.280 | −7.824 | −9.595 |
| | D | — | — | 8.800 | 8.800 | 8.800 | 8.800 | 8.800 | 8.800 |
| | M1 | — | — | 16.671 | 16.434 | 16.834 | 18.165 | 16.422 | 20.447 |
| | M3 | — | — | 9.300 | 8.351 | 6.090 | 10.461 | 7.711 | 9.622 |
| | M4 | — | — | 12.608 | 12.955 | 14.653 | 12.315 | 11.934 | 14.435 |
| | D41 | — | — | 2.150 | 2.300 | 2.500 | 2.500 | 2.300 | 2.000 |
| | R41 | — | — | 7.635 | 10.503 | 10.461 | 8.261 | 8.152 | 6.540 |
| | R42a | — | — | 17.036 | 16.478 | 16.304 | 28.911 | 18.907 | 13.969 |
| | R42b | — | — | 6.502 | 8.180 | 8.102 | 7.357 | 6.839 | 6.103 |

Next, a digital camera (optical apparatus) according to an embodiment using the zoom lens according to the present invention as a photographing optical system will be described using FIG. 26.

In FIG. 26, reference numeral 20 denotes a digital camera body, and reference numeral 21 denotes a photographing optical system including the zoom lens according to any one of the above-described embodiments. Reference character P denotes a prism. It guides an object image (projection light) transmitted through the photographing optical system 21 to an image pickup element (photoelectric conversion element) 22, such as a CCD sensor. Reference numeral 23 denotes a recording unit that records the object image received by the image pickup element 22. Reference numeral 24 denotes a finder for observing the object image displayed on a display element (not shown). The display element includes, for example, a liquid crystal panel, and displays the object image formed on the image pickup element 22. Reference numeral 25 denotes a liquid crystal display panel provided with a function equivalent to that of the finder.

Accordingly, a small image pickup apparatus providing high optical performance is realized as a result of applying the zoom lens according to the present invention to the optical apparatus, such as a digital camera.

According to the above-described embodiment, a compact zoom lens providing a high optical performance at a high zooming ratio and over an entire zooming range and including an optical system that is thin as a whole is provided.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-267614 filed Sep. 29, 2006, which is hereby incorporated by reference herein in its entirety.

What is claimed is:

1. A zoom lens comprising, in order from an object side to an image side:
   a first optical unit having a positive refractive power;
   a second optical unit having a negative refractive power;
   a third optical unit including an aperture;
   a fourth optical unit having a positive refractive power; and
   a fifth optical unit having a positive refractive power,
   wherein the second optical unit includes a negative lens member and a prism in that order from the object side to the image side, and is stationary during zooming,
   wherein, when zooming is performed from a wide-angle end to a telephoto end, the first, third, and fourth optical units are moved so that a distance between the first optical unit and the second optical unit is increased, a distance between the second optical unit and the third optical unit is reduced, and a distance between the third optical unit and the fourth optical unit is reduced, and
   wherein the following conditions are satisfied:

$0.20 < |f2|/\sqrt{(fW \cdot fT)} < 0.45$ $0.80 < |fN/fW| < 1.90$ $2.70 < L/fW < 4.20$ where fw and fT represent focal lengths of an entire system at the wide-angle end and the telephoto end, respectively, f2 represents a focal length of the second optical unit, fN represents a focal length of the negative lens member, a length of the prism in a light-axis direction is an air conversion length, and L represents a distance on the light axis from a lens surface of the second optical unit closest to the object side to the aperture at the wide-angle end.

2. The zoom lens according to claim 1, wherein a displacement of an image field caused by zooming is reduced as a result of moving the fifth optical unit during zooming.

3. The zoom lens according to claim 1, wherein the second optical unit includes the negative lens member, the prism, a negative lens, and a positive lens in that order from the object side to the image side, and wherein the following condition is satisfied:

$1.80 < n21 < 1.95$ where n21 represents an average refractive index value of a material of the negative lens member.

4. The zoom lens according to claim 1, wherein the following condition is satisfied:

$1.10 < |D/f2| < 2.00$ where D represents a thickness of the prism on the light axis.

5. The zoom lens according to claim 1, wherein the negative lens member includes at least one aspherical surface.

6. The zoom lens according to claim 1, wherein the following condition is satisfied:

$0.90 < M1/M4 < 1.70$ where M1 and M4 represent absolute values of amounts of movements of the first optical unit and the fourth optical unit, respectively, required for zooming from the wide-angle end to the telephoto end.

7. The zoom lens according to claim 1, wherein the following condition is satisfied:

$0.20 < M3/M4 < 1.20$ where M3 and M4 represent absolute values of amounts of movements of the third optical unit and the fourth optical unit, respectively, required for zooming from the wide-angle end to the telephoto end.

8. The zoom lens according to claim 1, wherein the fourth optical unit includes a positive 41st lens, whose object side has a convex form, a meniscus negative 42nd lens, whose object side has a convex surface, and a biconvex positive 43rd lens in that order from the object side to the image side, and wherein the following condition is satisfied:

$0.15 < D41/R41 < 0.40$ where R41 represents a curvature radius of an object-side surface of the 41st lens and D41 represents a center wall thickness of the 41st lens.

9. The zoom lens according to claim 8, wherein the following condition is satisfied:

$1.50 < R42a/R42b < 4.50$ where R42a represents a curvature radius of the object-side surface of the 42nd lens, and R42b represents a curvature radius of an image-side surface of the 42nd lens.

10. The zoom lens according to claim 1, wherein the following condition is satisfied:

$0.55 < \beta5T < 0.85$ where $\beta5T$ represents a lateral magnification when the fifth optical unit is moved during focusing and is focused on an object at infinity at the telephoto end.

11. The zoom lens according to claim 1, wherein the following condition is satisfied:

$0.35 < f1/fT < 0.85$ where f1 represents a focal length of the first optical unit.

12. An image pickup apparatus comprising:
   a solid-state image pickup element; and
   the zoom lens according to claim 1 that focuses an image on the solid-state image pickup element.

* * * * *